(12) United States Patent
Weber

(10) Patent No.: US 8,818,803 B2
(45) Date of Patent: *Aug. 26, 2014

(54) CHARACTER-BASED AUTOMATED TEXT SUMMARIZATION

(71) Applicant: Frank Elmo Weber, North Hollywood, CA (US)

(72) Inventor: Frank Elmo Weber, North Hollywood, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/751,079

(22) Filed: Jan. 26, 2013

(65) Prior Publication Data

US 2013/0144607 A1 Jun. 6, 2013

Related U.S. Application Data

(63) Continuation of application No. 12/298,709, filed on Oct. 27, 2008, now Pat. No. 8,392,183.

(51) Int. Cl.
| | | |
|---|---|---|
| *G10L 15/00* | (2013.01) | |
| *G06F 17/30* | (2006.01) | |
| *G10L 25/57* | (2013.01) | |
| *G06F 17/21* | (2006.01) | |
| *G06F 17/20* | (2006.01) | |
| *G06F 17/27* | (2006.01) | |
| *H04N 5/445* | (2011.01) | |
| *H04N 7/173* | (2011.01) | |
| *H04N 5/765* | (2006.01) | |
| *G06K 9/00* | (2006.01) | |
| *G10L 25/87* | (2013.01) | |
| *G10L 25/63* | (2013.01) | |

(52) U.S. Cl.
CPC .......... *G06F 17/21* (2013.01); *G06F 17/30719* (2013.01); *G10L 25/57* (2013.01); *G06K 9/00751* (2013.01); *G10L 25/87* (2013.01); *G10L 15/00* (2013.01); *G10L 25/63* (2013.01)
USPC ........ 704/231; 704/1; 704/9; 725/93; 725/53; 715/254; 386/231

(58) Field of Classification Search
USPC .................. 704/9, 231, 1; 725/93, 53; 707/5; 386/95, 231; 715/254
See application file for complete search history.

(56) References Cited

U.S. PATENT DOCUMENTS

| | | | | |
|---|---|---|---|---|
| 5,960,383 | A * | 9/1999 | Fleischer | 704/9 |
| 6,199,034 | B1 * | 3/2001 | Wical | 704/9 |
| 6,493,663 | B1 * | 12/2002 | Ueda | 704/9 |
| 6,537,325 | B1 * | 3/2003 | Nishizawa | 715/267 |
| 6,961,954 | B1 * | 11/2005 | Maybury et al. | 725/53 |
| 7,017,114 | B2 * | 3/2006 | Guo et al. | 715/247 |
| 7,051,024 | B2 * | 5/2006 | Fein et al. | 1/1 |

(Continued)

*Primary Examiner* — Paras D Shah
*Assistant Examiner* — Neeraj Sharma
(74) *Attorney, Agent, or Firm* — Musick Peeler LLP; Reid Dammann, Esq.

(57) ABSTRACT

Methods, devices, systems and tools are presented that allow the summarization of text, audio, and audiovisual presentations, such as movies, into less lengthy forms. High-content media files are shortened in a manner that preserves important details, by splitting the files into segments, rating the segments, and reassembling preferred segments into a final abridged piece. Summarization of media can be customized by user selection of criteria, and opens new possibilities for delivering entertainment, news, and information in the form of dense, information-rich content that can be viewed by means of broadcast or cable distribution, "on-demand" distribution, internet and cell phone digital video streaming, or can be downloaded onto an iPod™ and other portable video playback devices.

14 Claims, 28 Drawing Sheets

(56) References Cited

U.S. PATENT DOCUMENTS

| | | | |
|---|---|---|---|
| 7,251,781 B2 * | 7/2007 | Batchilo et al. | 715/210 |
| 7,263,530 B2 * | 8/2007 | Hu et al. | 1/1 |
| 7,292,972 B2 * | 11/2007 | Lin et al. | 704/9 |
| 7,376,893 B2 * | 5/2008 | Chen et al. | 715/254 |
| 7,627,590 B2 * | 12/2009 | Boguraev et al. | 1/1 |
| 7,738,778 B2 * | 6/2010 | Agnihotri et al. | 386/231 |
| 2002/0146168 A1 * | 10/2002 | Lee et al. | 382/165 |
| 2004/0122657 A1 * | 6/2004 | Brants et al. | 704/9 |
| 2005/0198570 A1 * | 9/2005 | Otsuka et al. | 715/515 |
| 2006/0165379 A1 * | 7/2006 | Agnihotri et al. | 386/95 |
| 2006/0184351 A1 * | 8/2006 | Corston-Oliver et al. | 704/1 |
| 2007/0073678 A1 * | 3/2007 | Scott et al. | 707/5 |
| 2008/0155616 A1 * | 6/2008 | Logan et al. | 725/93 |

\* cited by examiner

FIG. 2

BBC NEWS

An Afghan man who escaped a possible death sentence for becoming a Christian has arrived in Italy where he has been granted asylum, says Italy's PM.

Afghan MPs had earlier demanded Abdul Rahman, 41, stay in the country.

"He is already in Italy. I think he arrived overnight," Silvio Berlusconi said on Wednesday, hours after his cabinet approved the asylum plea.

Mr Rahman was freed on Monday after being deemed mentally unfit to stand trial on a charge of apostasy.

Mr Rahman's favour, says the BBC's David Willey in Rome.

Applications for political asylum in Italy normally take months to process, but Mr Berlusconi and several colleagues had said previously they favoured a quick decision in Mr Rahman, who had been charged with rejecting Islam, had been held at a secret location since his release from Kabul's high security Pul-e-Charki prison.

'Pressure'

Suggestions he might be offered asylum have outraged politicians in Afghanistan.

The issue was discussed in the Afghan parliament on Wednesday, with almost all MPs in agreement that "his leaving Afghanistan must be prohibited", the AFP news agency reported.

Dr Assadullah Hymatyar, an MP from Logar province, told the BBC that parliament was planning to investigate the events that led to Mr Rahman's release.

"We will ask the judge to explain to us why he was released. In the beginning they said he was mentally fit. So why is he mentally unfit now?" he asked.

FIG. 2(Continued)

"If he is really mentally unfit, then that's a separate issue. But if not we will ask the judge why he allowed international pressure to influence him."

There had been an international outcry at the prospect of Mr Rahman being executed for his religious beliefs, but Afghan legislators said the decision to release him from trial for apostasy was "contrary to the laws in place in Afghanistan".
Ambiguities Italy was among a number of countries which spoke out on Mr Rahman's behalf when news of his detention emerged.

Mr Berlusconi told Associated Press Television News: "I say that we are very glad to be able to welcome someone who has been so courageous."

The case has highlighted ambiguities in Afghanistan's constitution over the interpretation of religious issues.

Conversion, or apostasy, is a crime under Afghanistan's Islamic law.

Mr Rahman, who converted 16 years ago while working as an aid worker for an international Christian group, was arrested after police discovered him with a Bible.

An ethnic Tajik originally from the Panjshir Valley, north of Kabul, Mr Rahman returned to Afghanistan a few years ago.

It is thought that he was denounced by relatives after returning to seek custody of his two daughters. His family alleged he forced them to read the Bible, something he has denied.

In an interview with the Italian newspaper La Repubblica, Mr Rahman said: "I have done nothing to repent. I respect Afghan law as I respect Islam. But I chose to become a Christian, for myself, for my soul. It is not an offence."

FIG. 3

Afghan convert "arrives in Italy"
Numbered

1. An Afghan man who escaped a possible death sentence for becoming a Christian has arrived in Italy where he has been granted asylum, says Italy's PM.

2. Afghan MPs had earlier demanded Abdul Rahman, 41, stay in the country.

3. "He is already in Italy. I think he arrived overnight," Silvio Berlusconi said on Wednesday, hours after his cabinet approved the asylum plea.

4. Mr Rahman was freed on Monday after being deemed mentally unfit to stand trial on a charge of apostasy.

5. Mr Rahman, who had been charged with rejecting Islam, had been held at a secret location since his release from Kabul's high security Pul-e-Charki prison.

6. Applications for political asylum in Italy normally take months to process, but Mr Berlusconi and several colleagues had said previously they favoured a quick decision in Mr Rahman's favour, says the BBC's David Willey in Rome.

7. Suggestions he might be offered asylum have outraged politicians in Afghanistan.

8. The issue was discussed in the Afghan parliament on Wednesday, with almost all MPs in agreement that "his leaving Afghanistan must be prohibited", the AFP news agency reported.

9. Dr Assadullah Hymalyar, an MP from Logar province, told the BBC that parliament was planning to investigate the events that led to Mr Rahman's release.

10. "We will ask the judge to explain to us why he was released. In the beginning they said he was mentally fit. So why is he mentally unfit now?" he asked.

11. "If he is really mentally unfit, then that's a separate issue.

12. But if not we will ask the judge why he allowed international pressure to influence him."

FIG. 3(Continued)

13. There had been an international outcry at the prospect of Mr Rahman being executed for his religious beliefs, but Afghan legislators said the decision to release him from trial for apostasy was "contrary to the laws in place in Afghanistan".

14. Italy was among a number of countries which spoke out on Mr Rahman's behalf when news of his detention emerged.

15. Mr Berlusconi told Associated Press Television News: "I say that we are very glad to be able to welcome someone who has been so courageous."

16. The case has highlighted ambiguities in Afghanistan's constitution over the interpretation of religious issues.

17. Conversion, or apostasy, is a crime under Afghanistan's Islamic law.

18. Mr Rahman, who converted 16 years ago while working as an aid worker for an international Christian group, was arrested after police discovered him with a Bible.

19. An ethnic Tajik originally from the Panjshir Valley, north of Kabul, Mr Rahman returned to Afghanistan a few years ago.

20. It is thought that he was denounced by relatives after returning to seek custody of his two daughters.

21. His family alleged he forced them to read the Bible, something he has denied.

22. In an interview with the Italian newspaper La Repubblico, Mr Rahman said: "I have done nothing to repent, I respect Afghan law as I respect Islam.

23. But I chose to become a Christian, for myself, for my soul.

24. It is not an offence."

FIG. 4

Afghan convert "arrives in Italy"
Summarized by 48%

1. An Afghan man who escaped a possible death sentence for becoming a Christian has arrived in Italy where he has been granted asylum, says Italy's PM.

3. "He is already in Italy. I think he arrived overnight," Silvio Berlusconi said on Wednesday, hours after his cabinet approved the asylum plea.

6. Applications for political asylum in Italy normally take months to process, but Mr Berlusconi and several colleagues had said previously they favoured a quick decision in Mr Rahman's favour, says the BBC's David Willey in Rome.

8. The issue was discussed in the Afghan parliament on Wednesday, with almost all MPs in agreement that "his leaving Afghanistan must be prohibited", the AFP news agency reported.

9. Dr Assodulloh Hymotyor, an MP from Logar province, told the BBC that parliament was planning to investigate the events that led to Mr Rahman's release.

10. "We will ask the judge to explain to us why he was released. In the beginning they said he was mentally ill. So why is he mentally unfit now?" he asked.

13. There had been an International outcry at the prospect of Mr Rahman being executed for his religious beliefs, but Afghan legislators said the decision to release him from trial for apostasy was "contrary to the laws in place in Afghanistan".

15. Mr Berlusconi told Associated Press Television News: "I say that we are very glad to be able to welcome someone who has been so courageous."

18. Mr Rahman, who converted 16 years ago while working as an aid worker for an international Christian group, was arrested after police discovered him with a Bible.

20. It is thought that he was denounced by relatives after returning to seek custody of his two daughters.

21. His family alleged he forced them to read the Bible, something he has denied.

22. In an interview with the Italian newspaper La Repubblica, Mr Rahman said: "I have done nothing to repent, I respect Afghan law as I respect Islam.

23. But I chose to become a Christian, for myself, for my soul.

FIG. 5

Afghan convert "arrives in Italy"
Summarized by 75%

1. An Afghan man who escaped a possible death sentence for becoming a Christian has arrived in Italy where he has been granted asylum, says Italy's PM.

3. "He is already in Italy. I think he arrived overnight," Silvio Berlusconi said on Wednesday, hours after his cabinet approved the asylum plea.

13. There had been an international outcry at the prospect of Mr Rahman being executed for his religious beliefs, but Afghan legislators said the decision to release him from trial for apostasy was "contrary to the laws in place in Afghanistan".

18. Mr Rahman, who converted 16 years ago while working as an aid worker for an international Christian group, was arrested after police discovered him with a Bible.

21. His family alleged he forced them to read the Bible, something he has denied.

22. In an interview with the Italian newspaper La Repubblica, Mr Rahman said: "I have done nothing to repent. I respect Afghan law as I respect Islam."

FIG. 6

| FIG. 6A | FIG. 6B |
|---------|---------|
| FIG. 6C | FIG. 6D |
| FIG. 6E | FIG. 6F |
| FIG. 6G | FIG. 6H |

FIG. 6A

| ORIGINAL SENTENCES | 25 |
|---|---|
| SENTENCE CUT | 17 |
| ABRIDGED | 8 |
| PERCENTAGE | 32 |
| SIGNIFICANCE THRESHOLD | 75 |

| | SENTENCE NUMBER | 1 | 2 | 3 | 4 | 5 | 6 | 7 | 8 | 9 | 10 | 11 |
|---|---|---|---|---|---|---|---|---|---|---|---|---|
| | SENTENCE RATING | 99 | 44 | 99 | 39 | 41 | 63 | 44 | 57 | 51 | 55 | |
| | SENTENCE CUT | 0 | 1 | 1 | 1 | 1 | 1 | 1 | 1 | 1 | 0 | 1 |
| | NOUN SIGNIFICANCE FACTOR | | | | | | | | | | | |
| Nouns | | | | | | | | | | | | |
| 1 Afgan | 5 | 1 5 | 1 5 | 1 0 | 1 0 | 1 0 | 1 0 | 1 0 | 1 0 | 1 0 | 1 0 | 1 |
| 2 Abdul Rahman | 33 | 2 66 | 1 33 | 2 66 | 1 33 | 1 33 | 1 33 | 1 33 | 1 33 | 1 33 | 3 99 | 1 |
| 3 death Sentence | 1 | 1 1 | 1 0 | 1 0 | 1 0 | 1 0 | 1 0 | 1 0 | 1 0 | 1 0 | 1 0 | |
| 4 Christian | 3 | 1 3 | 1 0 | 1 0 | 1 0 | 1 0 | 1 0 | 1 0 | 1 0 | 1 0 | 1 0 | |
| 5 Italy | 6 | 2 12 | 1 0 | 1 6 | 1 0 | 1 0 | 1 6 | 1 3 | 1 0 | 1 0 | 1 0 | |
| 6 asylum | 3 | 1 3 | 1 0 | 1 3 | 1 0 | 1 0 | 1 0 | 1 0 | 1 0 | 1 0 | 1 0 | |
| 7 PM | 1 | 1 1 | 1 0 | 1 0 | 1 0 | 1 0 | 1 0 | 1 0 | 1 0 | 1 0 | 1 0 | |
| 8 Mp | 4 | 0 1 | 1 4 | 1 0 | 1 0 | 1 0 | 1 0 | 1 0 | 1 4 | 1 4 | 1 0 | |
| 9 country | 2 | 0 1 | 1 2 | 1 0 | 1 0 | 1 0 | 1 0 | 1 0 | 1 0 | 1 0 | 1 0 | |
| 10 Silvio Berlusconi | 7 | 0 0 | 1 0 | 1 0 | 1 0 | 1 0 | 2 14 | 1 0 | 1 0 | 1 0 | 1 0 | |
| 11 hours | 1 | 0 0 | 1 0 | 1 1 | 1 0 | 1 0 | 1 0 | 1 0 | 1 0 | 1 0 | 1 0 | |

| | | | | | | | | | | | | | | | | | | | |
|---|---|---|---|---|---|---|---|---|---|---|---|---|---|---|---|---|---|---|---|
| 34 | parliament | 2 | | 0 | 0 | 0 | 0 | 0 | 0 | 1 | 0 | 1 | 2 | 0 | 0 | | | | |
| 35 | Wednesday | 1 | | 0 | 0 | 0 | 0 | 0 | 0 | 1 | 2 | 1 | 1 | 0 | 0 | | | | |
| 36 | agreement | 1 | | 0 | 0 | 0 | 0 | 0 | 0 | 1 | 1 | 1 | 0 | 0 | 0 | | | | |
| 37 | leaving | 1 | | 0 | 0 | 0 | 0 | 0 | 0 | 1 | 1 | 1 | 0 | 0 | 0 | | | | |
| 38 | News Agency | 1 | | 0 | 0 | 0 | 0 | 0 | 0 | 1 | 1 | 1 | 0 | 0 | 0 | | | | |
| 39 | Assadullah Hymatyar | 5 | | 0 | 0 | 0 | 0 | 0 | 0 | 0 | 0 | 0 | 5 | 5 | 15 | | | | |
| 40 | Logar Province | 1 | | 0 | 0 | 0 | 0 | 0 | 0 | 0 | 0 | 1 | 1 | 3 | 0 | | | | |
| 41 | planing | 1 | | 0 | 0 | 0 | 0 | 0 | 0 | 0 | 0 | 1 | 1 | 1 | 0 | | | | |
| 42 | events | 1 | | 0 | 0 | 0 | 0 | 0 | 0 | 0 | 0 | 1 | 1 | 1 | 0 | | | | |
| 43 | judge | 4 | | 0 | 0 | 0 | 0 | 0 | 0 | 0 | 0 | 0 | 0 | 1 | 4 | | | | |
| 44 | they** | 1 | | 0 | 0 | 0 | 0 | 0 | 0 | 0 | 0 | 0 | 0 | 1 | 1 | | | | |
| 45 | pressure | 1 | | 0 | 0 | 0 | 0 | 0 | 0 | 0 | 0 | 0 | 0 | 1 | 1 | | | | |
| 46 | outcry | 1 | | 0 | 0 | 0 | 0 | 0 | 0 | 0 | 0 | 0 | 0 | 0 | 0 | | | | |
| 47 | prospect | 1 | | 0 | 0 | 0 | 0 | 0 | 0 | 0 | 0 | 0 | 0 | 0 | 0 | | | | |
| 48 | beliefs | 1 | | 0 | 0 | 0 | 0 | 0 | 0 | 0 | 0 | 0 | 0 | 0 | 0 | | | | |
| 49 | legilators | 1 | | 0 | 0 | 0 | 0 | 0 | 0 | 0 | 0 | 0 | 0 | 0 | 0 | | | | |
| 50 | laws | 3 | | 0 | 0 | 0 | 0 | 0 | 0 | 0 | 0 | 0 | 0 | 0 | 0 | | | | |
| 51 | behalf | 1 | | 0 | 0 | 0 | 0 | 0 | 0 | 0 | 0 | 0 | 0 | 0 | 0 | | | | |
| 52 | news | 2 | | 0 | 0 | 0 | 0 | 0 | 0 | 0 | 0 | 0 | 0 | 0 | 0 | | | | |
| 53 | detention | 1 | | 0 | 0 | 0 | 0 | 0 | 0 | 0 | 0 | 0 | 0 | 0 | 0 | | | | |
| 54 | Press | 1 | | 0 | 0 | 0 | 0 | 0 | 0 | 0 | 0 | 0 | 0 | 0 | 0 | | | | |
| 55 | Television | 1 | | 0 | 0 | 0 | 0 | 0 | 0 | 0 | 0 | 0 | 0 | 0 | 0 | | | | |

| | | | | | | | | | | | | | | | | | | | | | | | |
|---|---|---|---|---|---|---|---|---|---|---|---|---|---|---|---|---|---|---|---|---|---|---|---|
| 56 | case | 1 | | 0 | 0 | 0 | 0 | 0 | 0 | 0 | 0 | 0 | 0 | 0 | 0 | 0 | 0 | 0 | 0 | 0 | 0 | 0 | 0 |
| 57 | ambiguities | 1 | | 0 | 0 | 0 | 0 | 0 | 0 | 0 | 0 | 0 | 0 | 0 | 0 | 0 | 0 | 0 | 0 | 0 | 0 | 0 | 0 |
| 58 | constitution | 1 | | 0 | 0 | 0 | 0 | 0 | 0 | 0 | 0 | 0 | 0 | 0 | 0 | 0 | 0 | 0 | 0 | 0 | 0 | 0 | 0 |
| 59 | interpretation | 1 | | 0 | 0 | 0 | 0 | 0 | 0 | 0 | 0 | 0 | 0 | 0 | 0 | 0 | 0 | 0 | 0 | 0 | 0 | 0 | 0 |
| 60 | Conversation | 1 | | 0 | 0 | 0 | 0 | 0 | 0 | 0 | 0 | 0 | 0 | 0 | 0 | 0 | 0 | 0 | 0 | 0 | 0 | 0 | 0 |
| 61 | crime | 1 | | | 0 | 0 | 0 | 0 | 0 | 0 | 0 | 0 | 0 | 0 | 0 | 0 | 0 | 0 | 0 | 0 | 0 | 0 | 0 |
| 62 | years | 2 | | | 0 | 0 | 0 | 0 | 0 | 0 | 0 | 0 | 0 | 0 | 0 | 0 | 0 | 0 | 0 | 0 | 0 | 0 | 0 |
| 63 | aid worker | 1 | | | | 0 | 0 | 0 | 0 | 0 | 0 | 0 | 0 | 0 | 0 | 0 | 0 | 0 | 0 | 0 | 0 | 0 | 0 |
| 64 | group | 2 | | | | 0 | 0 | 0 | 0 | 0 | 0 | 0 | 0 | 0 | 0 | 0 | 0 | 0 | 0 | 0 | 0 | 0 | 0 |
| 65 | Bible | 2 | | | | | 0 | 0 | 0 | 0 | 0 | 0 | 0 | 0 | 0 | 0 | 0 | 0 | 0 | 0 | 0 | 0 | 0 |
| 66 | Tajik | 1 | | | | | 0 | 0 | 0 | 0 | 0 | 0 | 0 | 0 | 0 | 0 | 0 | 0 | 0 | 0 | 0 | 0 | 0 |
| 67 | Panjshir Valley | 1 | | | | | | 0 | 0 | 0 | 0 | 0 | 0 | 0 | 0 | 0 | 0 | 0 | 0 | 0 | 0 | 0 | 0 |
| 68 | It | 2 | | | | | | 0 | 0 | 0 | 0 | 0 | 0 | 0 | 0 | 0 | 0 | 0 | 0 | 0 | 0 | 0 | 0 |
| 69 | relatives | 1 | | | | | | | 0 | 0 | 0 | 0 | 0 | 0 | 0 | 0 | 0 | 0 | 0 | 0 | 0 | 0 | 0 |
| 70 | custody | 1 | | | | | | | | 0 | 0 | 0 | 0 | 0 | 0 | 0 | 0 | 0 | 0 | 0 | 0 | 0 | 0 |
| 71 | daughters | 1 | | | | | | | | | 0 | 0 | 0 | 0 | 0 | 0 | 0 | 0 | 0 | 0 | 0 | 0 | 0 |
| 72 | family | 2 | | | | | | | | | 0 | 0 | 0 | 0 | 0 | 0 | 0 | 0 | 0 | 0 | 0 | 0 | 0 |
| 73 | something | 1 | | | | | | | | | | 0 | 0 | 0 | 0 | 0 | 0 | 0 | 0 | 0 | 0 | 0 | 0 |
| 74 | interview | 1 | | | | | | | | | | | 0 | 0 | 0 | 0 | 0 | 0 | 0 | 0 | 0 | 0 | 0 |
| 75 | newpaper | 1 | | | | | | | | | | | | 0 | 0 | 0 | 0 | 0 | 0 | 0 | 0 | 0 | 0 |
| 76 | La Republica | 1 | | | | | | | | | | | | | 0 | 0 | 0 | 0 | 0 | 0 | 0 | 0 | 0 |
| 77 | nothing | 1 | | | | | | | | | | | | | | 0 | 0 | 0 | 0 | 0 | 0 | 0 | 0 |
| 78 | soul | 1 | | | | | | | | | | | | | | | 0 | 0 | 0 | 0 | 0 | 0 | 0 |
| 79 | offence | 1 | | | | | | | | | | | | | | | | 0 | 0 | 0 | 0 | 0 | 0 |

SEGMENT: 234 DX

SEGMENT SIGNIFICANCE VALUE: 112.36

| | TIMECODE | FRAMES |
|---|---|---|
| SEGMENT START | 1:12:14:12 | 129902 |
| SEGMENT END | 1:12:18:02 | 130012 |
| SEGMENT LENGTH | 0:00:03:20 | 110 |

DIALOGUE LINE: PUT DOWN THAT DAMN GUN, MARY! ARE YOU IDIOTS TRYING TO KILL ME?

| CHARACTER | ACTOR | SPEAKING | SPOKEN TO | MENTIONED | CHARACTER SIGNIFICANCE VALUE | CONFLICT | CONFLICT WEIGHTING | USER PREFERENCE WEIGHTING | RATING CONTRIBUTION |
|---|---|---|---|---|---|---|---|---|---|
| JOHN JONES | JEFF SIMMONS II | 1 | | 1 | 35 | 1 | 15% | 12% | 31.75 |
| MARY | ASHLEY SMITH | | 1 | 2 | 11 | 1 | 15% | 0% | 23.65 |
| VICTOR J. | JORGE JAMES | | | 1 | 13 | | 0% | 27% | 16.51 |
| | | | | | | | | | |
| | | | | | | | | | |

| NOUN | | | MENTIONED | NOUN SIGNIFICANCE VALUE | CONFLICT | CONFLICT WEIGHTING | USER PREFERENCE WEIGHTING | RATING CONTRIBUTION |
|---|---|---|---|---|---|---|---|---|
| gun | | | 1 | 27 | 1 | 15% | 15% | 35.1 |
| | | | | | | | | |
| | | | | | | | | |

TOTAL SHORT SIGNIFICANCE: 107.5
SEGMENT LENGTH WEIGHTING: 105%
SEGMENT SIGNIFICANCE VALUE: 112.36

PRIMARY SIGNIFICANCE CURVE OVERLAYS

FIG. 12

FRAME SEGMENT SUMMARY

| FRAME | 129913 |
|---|---|
| TIME CODE: | 1:12:14:28 |

| PRIMARY SIGNIFICANCE CURVE OVERLAYS | VALUE |
|---|---|
| DIALOGUE SEG. CONTENT | 67.01 |
| SHOT SEG. CONTENT | 55.73 |
| AUDIENCE REACTION | 46.22 |
| VOLUME | 75.65 |
|  |  |

| SECONDARY SIGNIFICANCE CURVE OVERLAYS | VALUE |
|---|---|
| BRIGHTNESS | 83.02 |
| MUSIC VOLUME | 62.95 |
| OTHER NON-DIALOGUE VOL. | 72.25 |
| SHOT LENGTH | 59.20 |
|  |  |

| FRAME SIG. VALUE TOTAL: | 64.23 |
|---|---|

FIG. 14

```
Subtitles - English
"Night of the Living Dead" (1968)

{1321}{1444}- They're coming to get you, Barbara.|- Stop it.
{1524}{1620}They don't like being awakened this way.
{1624}{1668}Why do you have to be so mean?
{1671}{1711}I'm your older brother.
{1714}{1798}Being mean is part of my job.
{1821}{1926}They're coming to get you, little sister.
{2091}{2170}You never know when to stop.
{2213}{2278}What's the matter? Getting scared?
{2281}{2339}You're still scared of her, aren't you?
{2342}{2383}That's why we're here.
{2386}{2459}No, that's not why we're here.
{2506}{2626}Why do we have to put ourselves|through this charade?
{2629}{2680}Because she is our mother.
{2683}{2739}Can't you give her one day of your life?
{2742}{2792}One day? This is the fourth time
{2795}{2860}in the three months since she died.
{2863}{2961}I'm spending more time with her now.
{2965}{3014}And you know why?
{3018}{3113}She couldn't be buried in the city.
{3129}{3204}She knew I had to drive you here.
{3207}{3295}We're 200 miles from a glass of beer.
{3297}{3361}Johnnie, we're here. Please stop it.
{3363}{3426}Stop what? The truth?
{3557}{3631}She damn near drove you into a convent.
{3634}{3671}When have you had a date?
{3673}{3737}That is none of your business!
{3739}{3799}The one thing she never ever drove,
{3802}{3857}was 200 miles to visit anything.
{3902}{3974}I need you to stop talking like that.
```

FIG. 15

LINE 55

Dialogue Segment Significance Value     1038.3     79.2%

Start Frame     27245     00:15:09:08
         End Frame       27378     00:15:13:15

12.2       436.7    57.6      23.2   436.7   14.3        57.6

Look here, Barbara. (I) don't need you falling apart on me.

| Ben X | Tom | Scientist |
| Barbara | Judy | Newscaster |
| Harry | Karen | Dan |
| Helen | Sheriff | Mike |

*FIG. 16*

| SEG. | FRAME | DIALOGUE LINE | DSSV | DIV | Mode |
|---|---|---|---|---|---|
| 1 | {1321}{1444} | - They're coming to get you, Barbara.|- Stop it. | 470 | 39.6 | 1 |
| 2 | {1524}{1620} | They don't like being awakened this way. | 320 | -110 | 0 |
| 3 | {1624}{1668} | Why do you have to be so mean? | 240 | -190 | 0 |
| 4 | {1671}{1711} | I'm your older brother. | 410 | -20.2 | 0 |
| 5 | {1714}{1798} | Being mean is part of my job. | 111 | -319 | 0 |
| 6 | {1821}{1926} | They're coming to get you, little sister. | 22 | -408 | 0 |
| 7 | {2091}{2170} | You never know when to stop. | 421 | -9.2 | 0 |
| 8 | {2213}{2278} | What's the matter? Getting scared? | 244 | -186 | 0 |
| 9 | {2281}{2339} | You're still scared of her, aren't you? | 255 | -175 | 0 |
| 10 | {2342}{2383} | That's why we're here. | 11 | -419 | 0 |
| 11 | {2386}{2469} | No, that's not why we're here. | 54 | -376 | 0 |
| 12 | {2506}{2626} | Why do we have to put ourselves|through this charade? | 555 | 126 | 1 |
| 13 | {2629}{2680} | Because she is our mother. | 765 | 335 | 1 |
| 14 | {2683}{2739} | Can't you give her one day of your life? | 411 | -19.2 | 0 |
| 15 | {2742}{2792} | One day? This is the fourth time | 222 | -208 | 0 |
| 16 | {2795}{2860} | in the three months since she died. | 365 | -85.2 | 0 |
| 17 | {2863}{2961} | I'm spending more time with her now. | 34 | -398 | 0 |
| 18 | {2965}{3014} | And you know why? | 54 | -376 | 0 |
| 19 | {3018}{3113} | She couldn't be buried in the city. | 56 | -374 | 0 |
| 20 | {3129}{3204} | She knew I had to drive you here. | 322 | -108 | 0 |
| 21 | {3207}{3295} | We're 200 miles from a glass of beer. | 265 | -165 | 0 |
| 22 | {3297}{3361} | Johnnie, we're here. Please stop it. | 890 | 460 | 1 |
| 23 | {3363}{3426} | Stop what? The truth? | 987 | 557 | 1 |
| 24 | {3557}{3631} | She damn near drove you into a convent. | 23 | -407 | 0 |
| 25 | {3634}{3671} | When have you had a date? | 412 | -18.2 | 0 |
| 26 | {3673}{3737} | That is none of your business! | 333 | -97.2 | 0 |
| 27 | {3739}{3799} | The one thing she never ever drove, | 41 | -389 | 0 |
| 28 | {3802}{3857} | was 200 miles to visit anything. | 234 | -196 | 0 |
| 29 | {3902}{3914} | I need you to stop talking like that. | 487 | 56.6 | 1 |
| 30 | {3977}{4050} | Don't talk like that. Not here. | 898 | 468 | 1 |
| 31 | {4064}{4114} | Not in the middle of... | 1020 | 590 | 1 |
| 32 | {4117}{4168} | Of what? | 767 | 337 | 1 |
| 33 | {4171}{4238} | Show some respect. | 798 | 368 | 1 |
| 34 | {4284}{4384} | You really are afraid of this place. | 658 | 228 | 1 |
| 35 | {4387}{4460} | God, you never stop. | 987 | 557 | 1 |
| 36 | {4495}{4570} | For the love of God, Johnnie. Bastard! | 678 | 248 | 1 |
| 37 | {4573}{4605} | Jesus, you're weird. | 567 | 137 | 1 |
| | {4605}{5307} | Shot Segment Cluster 001   Total Time: 00:23:13   Total Frames 702 | | | |
| 38 | {5307}{5373} | Let's just get through this.|Just get it over with. | 878 | 448 | 1 |
| 39 | {5416}{5472} | They're coming to get you, Barba... | 655 | 225 | 1 |
| 40 | {5475}{5569} | For the love of God, Johnnie. | 677 | 287 | 1 |
| 41 | {5572}{5627} | They're sorry, Barbara.|They've been dead a long time. | 234 | -196 | 0 |
| 42 | {5630}{5766} | Look! There's one of them now.|He wants you. | 787 | 357 | 1 |
| 43 | {5769}{5887} | He's getting closer. | 656 | 226 | 1 |
| 44 | {5909}{5967} | - Dangerously closer!|- Stop it, Johnnie | 445 | 14.8 | 1 |
| 45 | {6009}{6117} | He's going to hear you. | 342 | -88.2 | 0 |
| 46 | {6608}{6717} | It doesn't matter. He knows we're here.|It's too late now | 321 | -109 | 0 |
| 47 | {6720}{6806} | There's no escape.|Nooo, mother!! | 234 | -198 | 0 |
| 48 | {6939}{6006} | You bastard. | 11 | -419 | 0 |
| 49 | {6031}{6170} | - Johnnie|- I'm sorry. Very sorry. | 323 | -107 | 0 |

Double-click on this line and the
*Shot Segment Overview List*
will become the top window Double-click on any *Dialogue Segment* line and
the *Dialigue Segment Attribute Summary*
will become the top window

FIG. 17A    FIG. 17B    FIG. 17C

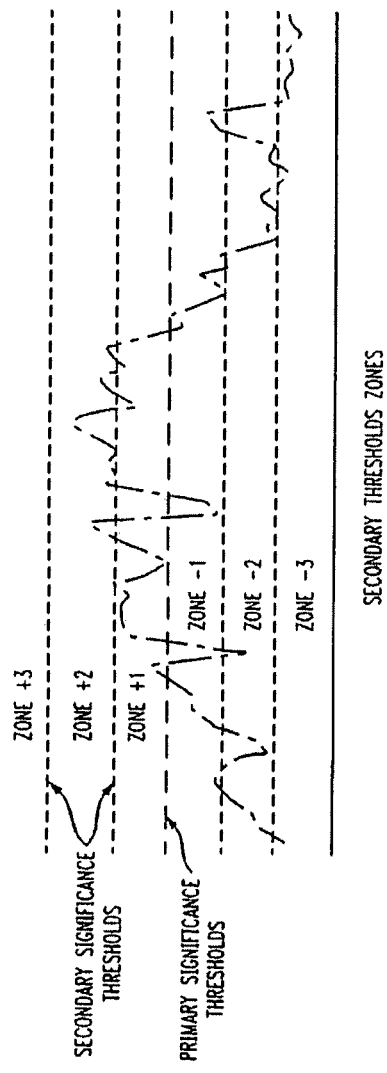

CHARACTER-BASED AUTOMATED TEXT SUMMARIZATION

CROSS-REFERENCE TO RELATED APPLICATIONS

This application is a continuation U.S. non-provisional patent application Ser. No. 12/298,709, filed Oct. 27, 2008, which is a continuation-in-part of international application PCT/US2007/067207, with an international filing date of Apr. 23, 2007, which claims the benefit of U.S. provisional application Nos. 60/745,588, filed Apr. 25, 2006, 60/890,214, filed Feb. 16, 2007, and 60/892,311, filed Mar. 1, 2007. Each patent application identified above is incorporated by reference in its entirety to provide continuity of disclosure.

BACKGROUND OF THE INVENTION

1. Field of the Invention

The invention relates to the audiovisual arts and to software and systems for manipulating data sets in the cinematic and literary fields.

2. Description of the Related Art

Audiovisual presentations are common and play a major role in modern life. Movies, demonstrations, television programs and other audiovisual information may be prepared and stored as files, which may be manipulated by computer or other electronic devices. Such files may be edited via a variety of technologies. See, for example, U.S. Pat. Nos. 3,890,639, 5,367,341, 5,388,197, 6,052,508, and 6,965,723. The contents of each cited patent, and in particular the hardware, software, methods and systems for storing and editing such audio video files specifically are incorporated by reference in their entireties.

Audiovisual presentations prepared by these and other editing methods have proliferated greatly. An emerging problem is the length of many audiovisual presentations. Unfortunately, many movies, television programs and other series last an hour or more. Busy people often cannot watch such presentations. Some movies and television shows thus are not seen by some people because of their length. Accordingly, any method that can provide the basic information of a long audiovisual presentation in a shorter time would expand the audiovisual market and promote further business. At the same time, the advent of small screen video players, such as the video iPod™ and video cell phone, call for short format audiovisual presentations. The small-screen market for feature films and television programs certainly would improve with shorter running times. In the same vein, long download times and large file sizes of full-length feature films are problematic to media consumption. Despite these needs, attempts to systematize the shortening of audiovisual files have not progressed sufficiently.

SUMMARY OF THE INVENTION

The problem of insufficient time for watching a long, detailed audiovisual presentation such as a movie, is alleviated by devices and methods that remove at least most of an audiovisual presentation, while preferentially maintaining important information. In an embodiment, a subject audiovisual presentation is provided having a video portion which may include, for example, segments identified as shots, images, frames, image sequences; as well as an audio portion which may include segments of spoken dialogue, and/or other non-dialogue audio, such as sound effects, musical scoring, and/or audience reactions. The identified components contained within said segments are rated by the frequency of their existence in the overall audiovisual presentation. The component rating optionally is further weighted by a database of user preferences and other factors, such as the perceived presence of stress or conflict. The segments are then rated based on the combined ratings of the components that they contain. The segments deemed to have less significant content are skipped, or abbreviated, creating a summarized output file.

An embodiment provides a system for the automatic summarization of an audiovisual presentation wherein the audiovisual presentation comprises multiple Dialogue Segments, Non-Dialogue Segments, Non-Dialogue Segments with Music, and Shot Segments. This system desirably comprises a storage medium for storing an electronic copy of the audiovisual presentation; a stored program that identifies the segments, evaluates and generate significance ratings for the audio and visual segments based on the presence of one or more Segment Components within the segments; stored and tagged memory locations for monitoring timecode locations and ratings of the segments as well as identification and significance ratings of the Segment Components they contain and, a stored program that filters out less-desirable segments based on a mathematical comparison of the Significance Values of the segments to a selectable Segment Significance Value Threshold.

These and other embodiments can address shortcomings of the prior art by one or more of: using input method step(s) to allow user preference customization; use of simple but robust inductive machine learning text pattern recognition method of content auto-summarization; definition of a multiplicity of parameters to fine-tune segment boundaries and rating prioritization, including for example, "global formulaic experimentation." Definition of a multiplicity of parameters in particular allows for the use of "global formulaic experimentation" to affect the interaction of the inputted statistics in different ways thereby fine-tuning the output file.

Further embodiments provide methods to reduce or eliminate artifacts that can result from auto-summarization, creating smoothly consumable output files; methods that maintain the "entertainment value" of a full-length audiovisual presentation in a summarized output file; and real-world solutions to the computational complexity theory as the theory is applied to relationships between current microprocessor technology and the end-user auto-summarization experience.

A method is included for summarizing a text document. The method comprises comprising: providing a text document having a first temporal length, the text document comprising: a plurality of sentence segments, each sentence segment comprising at least one segment component;—a plurality of secondary segments comprising at least one non-dialogue segment; rating each sentence segment by automatically determining a significance value for each sentence segment, the method comprising: determining at least one word significance value for at least one characteristic of at least one segment component including determining whether the segment component is a noun, pronoun, reference to a story character, a frequency of occurrence of the segment component, a match of the segment component to a predetermined database word; and combining the at least one word significance value; optionally determining a secondary significance value of one or more of the secondary segments wherein the secondary significance value weights the significance value of the sentence segment; receiving a user generated significance value threshold; using the significance value threshold to select the sentence segment if the significance value of the sentence segment exceeds the significance value threshold, and delete the sentence segment if the significance value of the sentence segment is below the significance value threshold; combining each sentence segment with the sentence segment significance value exceeding the significance value threshold into a summarized version of the text document; and providing the summarized version of the text document, the text document having a second temporal length. Other embodiments will be appreciated by a skilled artisan upon reading the specification.

BRIEF DESCRIPTION OF THE DRAWINGS

FIG. 2 is a news article that was shortened in an embodiment;

FIG. 3 is the news article of FIG. 2 that has been separated into Sentence Segments;

FIG. 4 is the news article of FIG. 1 shortened by 48%;

FIG. 5 is the news article of FIG. 1 shortened by 75%;

Figure 6B:
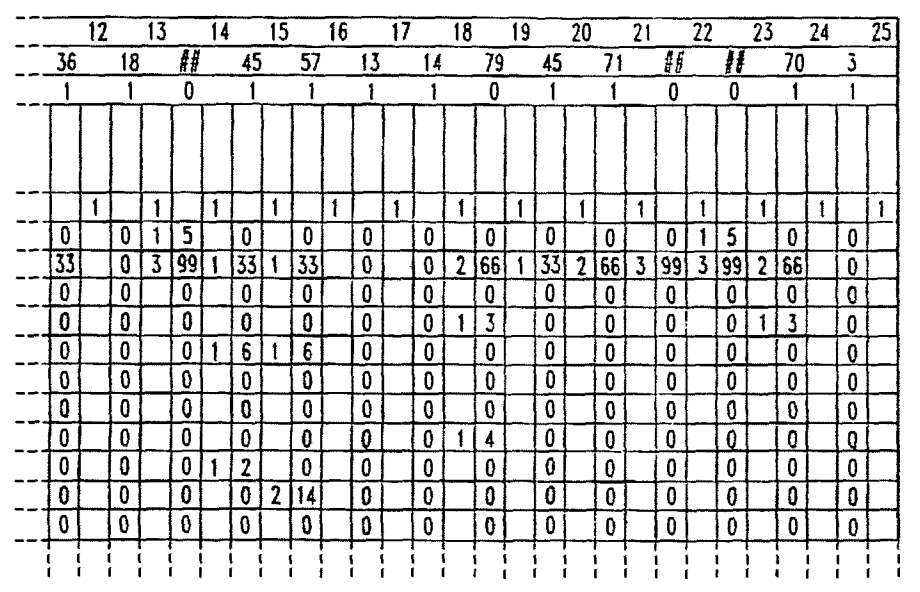
Figure 6C:
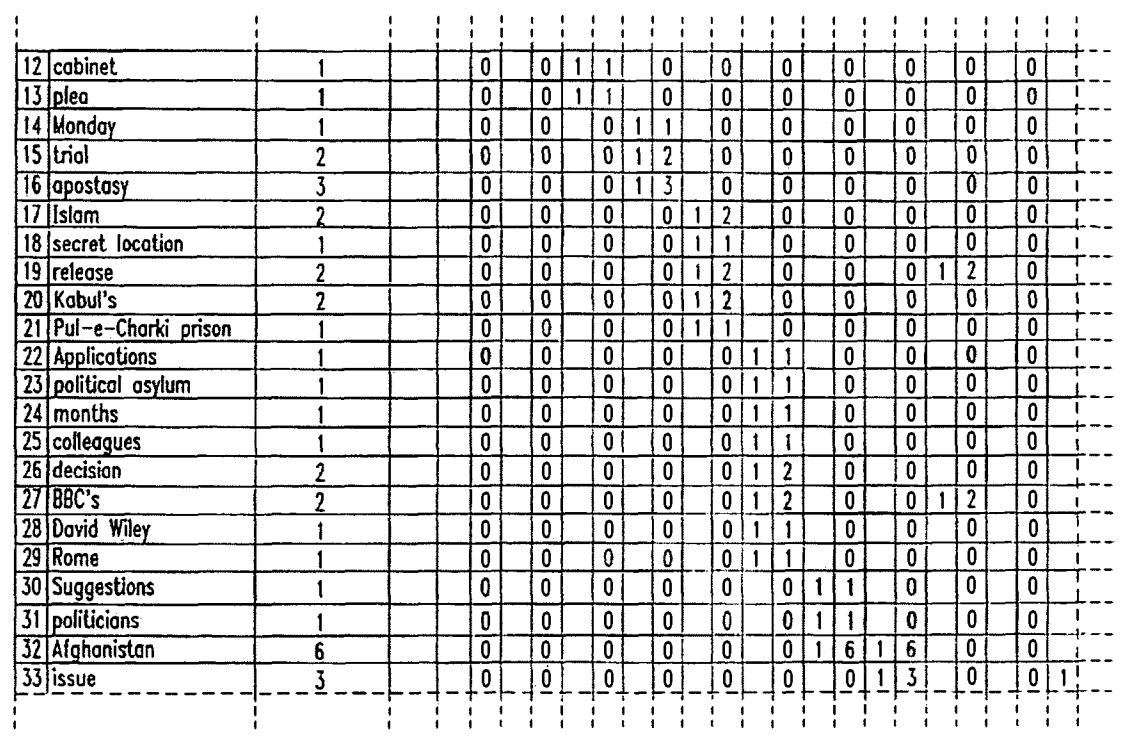
Figure 6D:
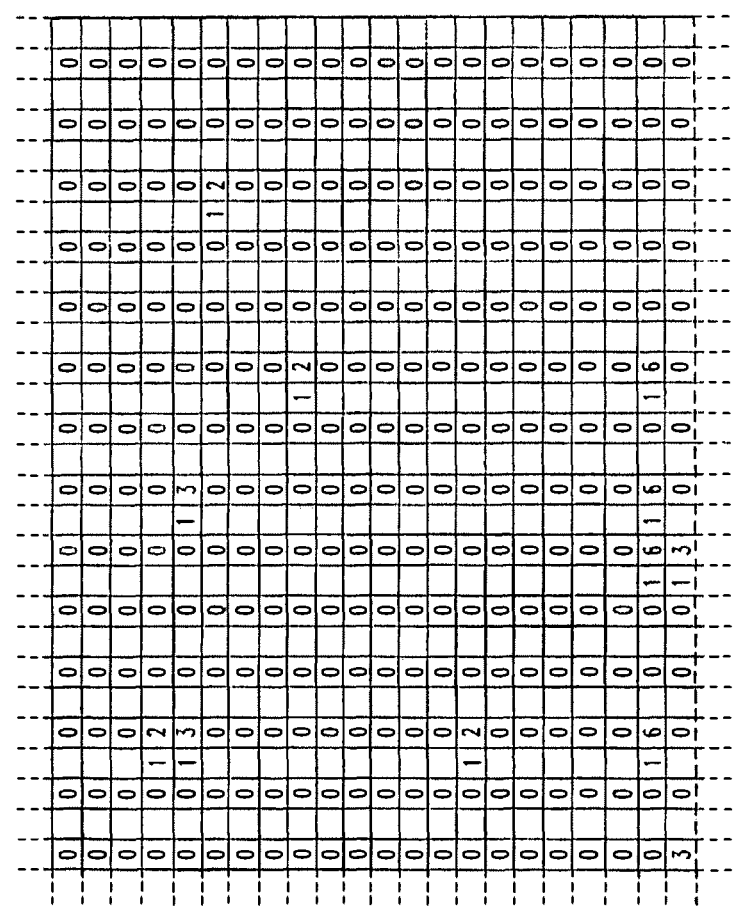
Figure 6F:
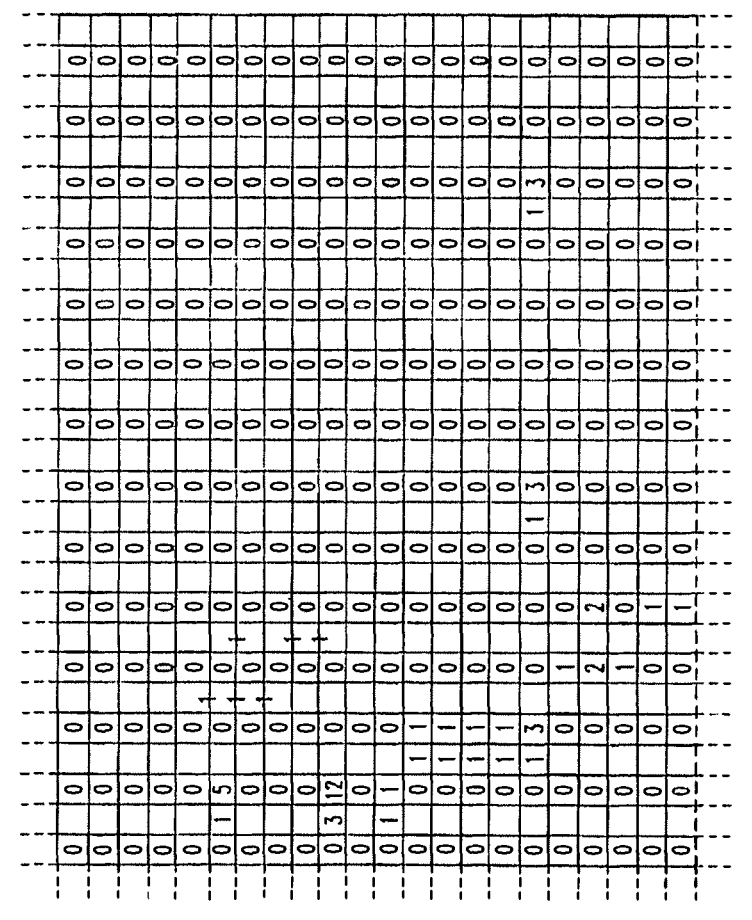
Figure 6H:
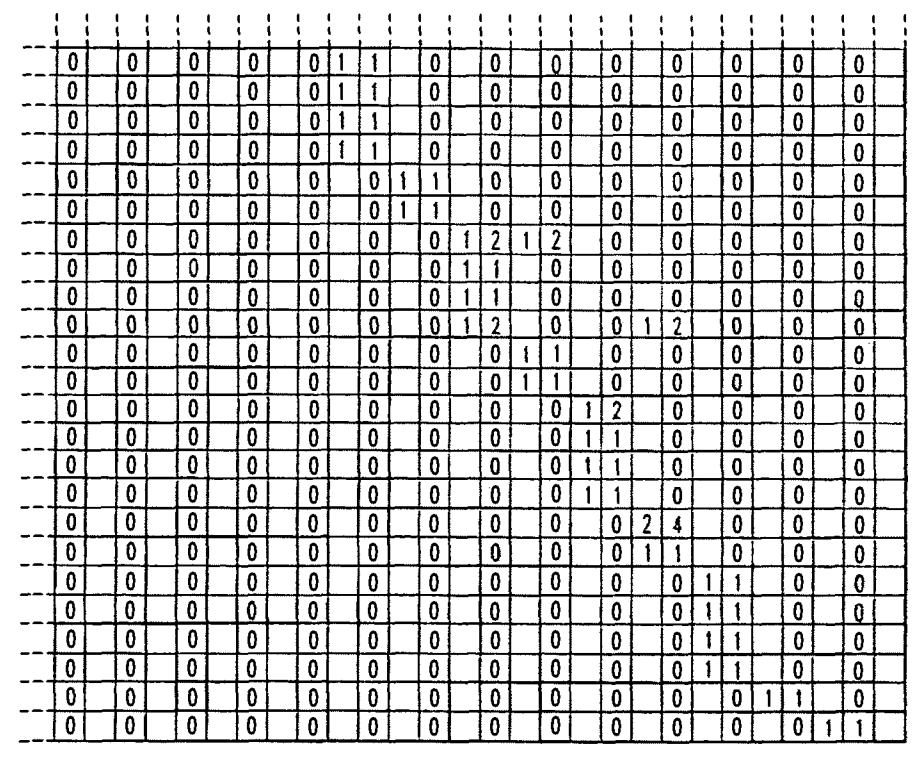

FIG. 6-6H show a matrix from which nouns and sentences were rated for automatic summarization;

FIG. 8 shows another example of a Segment Attribute Summary;

FIG. 12 shows an example of a Frame Segment Summary;

FIG. 14 shows a list of dialogue segments;

FIG. 15 shows another embodiment of a Segment Attribute Summary;

FIG. 16 shows a dialogue segment overview panel of clusters of dialogue segments and their associated significance values, deviation from the significance threshold, and mode;

FIGS. 17A-17C shows the process of reversing modes based on cluster adjacency;

FIG. 18 shows secondary threshold zones as they relate to a Significance Curve Overlay.

DESCRIPTION OF THE PREFERRED EMBODIMENT(S)

Figure 1:
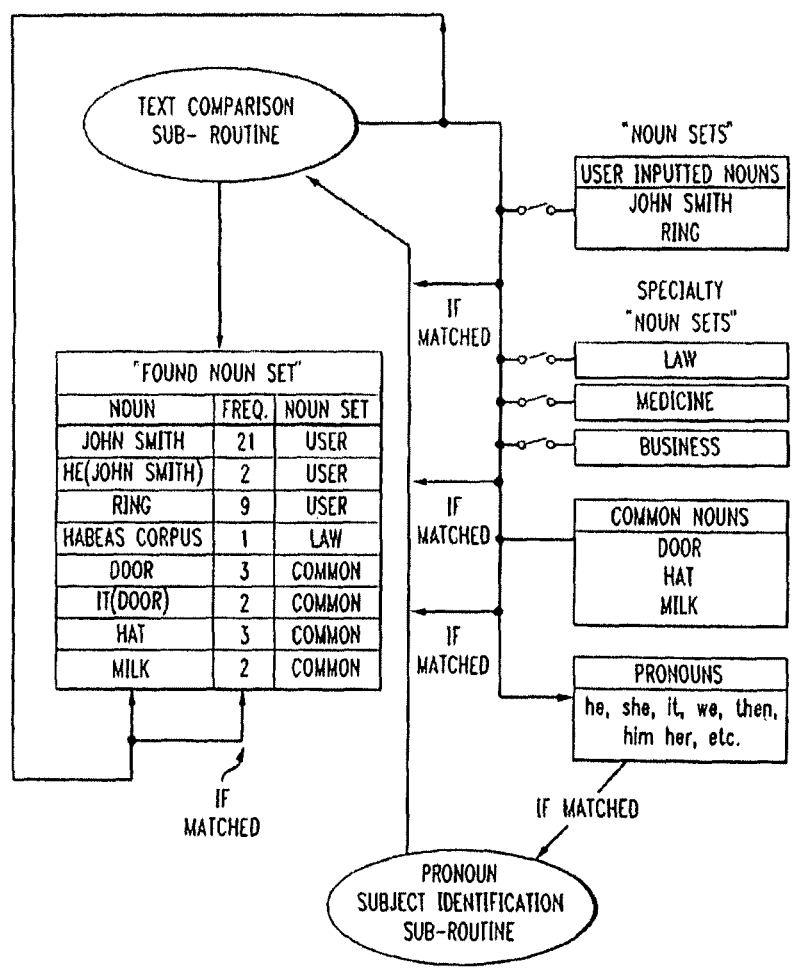
FIG. 1 shows a method for shortening a text document based on noun usage.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

An embodiment provides a method for the automatic or manual summarization by at least 50% in time length, of an audiovisual presentation of at least 15 minutes in length, comprising the steps of: a) providing an audiovisual presentation, such as a feature-film, documentary video, documentary film, television program, or instructional video, stored on a linear optical or analogue medium, such as film or magnetic tape, or stored on a digital linear or non-linear medium, such as magnetic tape, hard disk drive, RAM (random access memory), or Flash RAM; b) identifying and dividing the audio portion of said audiovisual presentation into dialogue segments and non-dialogue segments; c) identifying and dividing the visual portion of said audiovisual presentation into shots or shot segments; d) taking into account at least 75% of the segments of b) and c), and rating them as to their significance to the audiovisual presentation; and e) deleting less significant dialogue segments, non-dialogue segments, and/or shot segments, and reassembling the more significant segments in their original order, thereby forming a summarized version at least 50% shorter in time length, while preserving the story line, plot, message, and other important concepts of the unabridged audiovisual presentation.

An embodiment preserves at least most of the story of the unabridged audiovisual presentation in the summarized audiovisual presentation. A story line may be the plot of a book, play, or film. A story line also may be the plan or main story of a literary work. Segments that come together in a summarized audiovisual presentation generally have a relationship with a story line of the unabridged piece. In an embodiment, an unabridged audiovisual presentation is used to create a shorter output file that is referred to herein as a summarized audiovisual presentation. In an embodiment, the methods for this, as described herein produce an automatic choice of what material comprises the complimentary portion of the unabridged audiovisual presentation that can be removed without compromising the story line contained therein.

The derivative product of this method, or summarized audiovisual presentation is much different from a commercial, trailer, or highlight sequence. A commercial, trailer, or highlight sequence often is created by identifying highly desirable video shots and dialogue lines from an unabridged audio-visual presentation and adding those shots together to represent a mere sample of the original. In an embodiment described herein, portions of an original are selected for removal rather than for addition. Furthermore, the time order of segments from the unabridged piece generally is maintained and a storyline is followed. Still further, embodiments are not shortened for the sole intent of providing the viewer a tease, or glimpse of a story. In an embodiment, a summarized audiovisual presentation contains between 10% and 80% of the unabridged piece.

Although greedily summarized, in many instances, the summarized audiovisual presentation produced, conveys the story line and maintains the "entertainment value" of the full-length unabridged audiovisual presentation. This gives the viewer of the summarized audiovisual presentation the sensation of having watched the unabridged piece.

One or more shorter versions of an audiovisual presentation such as a movie are made by separating an unedited, longer version into segments, such as Dialogue Segments, Non-dialogue Segments, and Shot Segments. The segments are characterized by significance. Higher significant segments are maintained preferentially, while lesser significant segments are not included in a reassembled version. The preservation of story line meaning via this process was surprising, given how much (typically 70% or more) of the longer version was removed. This segmentation may be achieved by any of a number of techniques as will be appreciated by a skilled artisan.

Once separated, many, most, or preferably all of the segments are evaluated and rated according to significance. After rating, segments of higher significance desirably are grouped separately from segments of lesser significance. From this separation, characterization and optional regrouping, a much shorter version of the unabridged audiovisual presentation is made that maintains much of the original information content. The shorter summarized audiovisual presentation may be made, for example, by deleting less significant segments from the remainder, by grouping more significant segments into a new, separate file. In a particularly desirable embodiment, the input file remains uncut and the less significant segments are merely skipped during playback.

A skilled artisan readily will appreciate techniques for carrying out some of these activities, as represented, for example in U.S. Pat. No. 6,640,044, the contents of which, and particularly pertaining to storage and playback, is incorporated by reference in its entirety.

Separation of the Audiovisual Presentation into Segments

A full-length, unabridged subject audiovisual presentation, is a self-contained video or film presentation between 5 minutes and 10 hours in length, and more typically between 30 minutes and five hours in length, consists of visual and synchronized narrative audio material, and is stored on a linear or non-linear media. Examples of a full-length audiovisual presentation include a feature-film, documentary video, documentary film, television program, or instructional video and combinations of such.

After initially storing an audiovisual presentation in a media such as a computer memory, or computer accessible memory, the audiovisual components preferably are separated into distinct segments. A segment is "distinct" in that the segment has a beginning point and an ending point. The beginning and end points may be determined manually or automatically.

A segment or segments of text desirably can be extracted from the spoken language or dialogue from a full-length audiovisual presentation by a variety of techniques, including but not limited to: a) speech recognition (see for example, U.S. Pat. No. 4,947,438, the contents of which, and particularly pertaining to speech recognition, are incorporated by reference in their entireties; and b) character recognition (see, for example, U.S. Pat. No. 4,989,258, the contents of which, and particularly pertaining to text character recognition, are incorporated by reference in their entireties. Computerized character recognition can gather all of or substantially all of on-screen text including subtitle information. In an embodiment, subtitle information is used that is imbedded on a DVD or other medium and can be used directly to create a text file of all subtitles from the full-length audiovisual presentation.

In an embodiment, segments are evaluated for signs of stress or conflict by the observation of volume and tone of speech, shape of mouth and eyebrows, and the comparison of Dialogue Segment Components to Verb and Adjective sets. Conflict, traditionally a key component of a story line, is weighted separately, typically more heavily, by a variable of user input.

A segment may comprise both audio information and corresponding visual information, or may consist of only audio, or only visual information. Preferably, an audio segment and a visual segment are linked by an associated tag and the audio segment alone initially is analyzed and categorized. An associated tag can for example be a number but can be more, and may specify the start and/or stop locations of the segment within the larger audiovisual presentation, and may specify the time duration of the segment. A tag may also refer to a stored table or matrix that contains information concerning the audio and/or visual segments associated with the tag.

Considered more closely, a segment often is a continuous set of data such as an audio sequence, visual sequence, and/or a combined visual and audio sequence. The actual beginning and/or end of a segment desirably may be determined by the information in the segment. In an embodiment, a segment's start and end points may be determined (set by a computer process, manually or a combination of both) by analyzing the presence of dialogue. A minimum quiet (non dialogue) space of time may be used to determine the segment border. In some compositions, a segment end may be determined by the presence of certain kinds of words, by the volume of a word, inflection used to express the word, by the co-presence of the word with video information, or by a change in video background scene. Combinations of such events also may be used. In an embodiment, Dialogue Segment division occurs when a new character or person begins speaking. Which character or person is speaking can be determined by analysis of the audio segment using voice recognition, or by analysis of the visual segment using face recognition and shape recognition (for mouth movement detection), or a combination thereof.

Non-dialogue information may be visual information, may be strategically placed pauses in dialogue, or other non-verbal content information.

A dialogue segment is a sentence spoken by a fictional or non-fictional character, the words making up a part in a drama or non-fiction story.

Dialogue information can be words uttered by a person, or other entity, such as a computer, talking animal or talking animated object. Narration that is not linked specifically to video movements may be included as dialogue. Dialogue may be aural but also may be visual, such as a communication by a sign, a video screen, subtitle, or pantomime. In a desirable embodiment all such dialogue may be expressed, translated, or interpreted as words, which can be entered into a file for automatic or manual analysis.

In another embodiment that uses a term familiar to many in the Film and Television industry, segments of the subject audiovisual presentation are identified and analyzed as shots. A shot is defined in "The Complete Film Dictionary" (Konigsberg, 1987), as: "the continuous action on the [cinema] screen resulting in what appears to be a single run of the camera." The same source also defines a shot as: "the building block of a film." In this embodiment at least most of the shots of the audiovisual presentation are analyzed for significant content.

Segment Characterization

In most instances dialogue segments were found more valuable than non-dialogue segments for maintaining the meaning of a larger unabridged audiovisual presentation when preparing a shorter version. Thus, in a most desirable embodiment, audio information initially is separated into dialogue and non-dialogue segments. This separation by itself is a valuable type of characterization.

Significance of a character or other noun may be determined by the number of times that character or noun is mentioned in the unabridged audiovisual presentation. The significance of a character may be further determined by the number of sentences and the amount of time that the character speaks as compared to the other characters.

Most desirably, words used in dialogue segments are reviewed and significance is determined by the presence of and/or frequency of specific words and/or word types. Nouns were found to be most useful in this context. For example, segments that contain specific nouns that refer to the same thing or person were scored based on the presence of the noun in the segment. This noun scoring used for several audiovisual pieces was found to provide shortening while significantly maintaining meaning. The "presence" of the noun may be merely quantitative, such as the existence of or how many times the noun is uttered or otherwise displayed. The "presence" may be modified by other parameters, such as the length of the segment, or the existence of another noun or nouns that are associated with a strong story line.

In an embodiment, the audio portion of an audiovisual presentation is divided into three types of segments: Dialogue Segments, Non-dialogue Segments, and Non-dialogue Segments with Music. Non-dialogue Segments with Music sometimes contain material of little significance to the story line of the unabridged audio-visual presentation, but may contain material that arguably provides entertainment value. An example may be a musical number or a car chase. Removal of car chases and/or musical numbers is a desirable step in one embodiment.

In an embodiment, assuming a shortening ratio of five to one, any random 20% portion of a non-dialogue segment with music can be used with the intention of adding entertainment value to the summarized audiovisual presentation. A crude method of shortening the Non-dialogue Segments with Music, by this exemplified ratio of 1:5, is to use the first 10% and the last 10%, but to remove the middle 80% of the non-dialogue segment. Although this embodiment is exemplified with a 20% portion and a ratio of 1:5, any other range of percentages and ratios similarly may be used.

In the case of a musical number, at least the first verse and the final chorus of the number, or at least the final chorus, optionally may be included in the summarized audiovisual presentation, in whatever configuration does not exceed the overall percentage of desired summarization. Methods can be used to separate sections of songs into segments for rating and summarization (see for example, U.S. Application 20060210157, the contents of which, and particularly pertaining to the summarization of music videos, are incorporated by reference in their entireties.

In a most desirable embodiment, a non-dialogue sequence can be summarized by utilizing the ratings of visual segment components. The visual presence of a component can be used to generate that segment's Shot Significance Value. The Shot Significance Value of each shot is compared to a Shot Significance Value Threshold set by the user. Shots that have Shot Significance Values below the Shot Significance Value Threshold are skipped in the summarized output file.

In an embodiment, the shorter the shot segment, the higher the significance. Consider this: if 'a picture paints a thousand words,' then in an embodiment, a cinematic shot could be said to do the same. If a two second shot and a ten second shot both 'paint' a thousand words, then the two second shot would 'paint' 500 words per second and the ten second shot would 'paint' 100 words per second, therefore, each second of the two second shot is more valuable than that of the ten second shot. This type of evaluation could represent a parameter of shot significance rating.

In an embodiment, longer Shot Segments are split into shorter segments of equal lengths. Each of the shorter Shot Segments may be individually analyzed for content significance. In a preferred embodiment, longer Shot Segments are broken into smaller segments, the boundaries determined by the entrance or exit of characters or objects, abrupt changes in speed of characters or objects, abrupt flashes of light, or changes in scenery. If considered significant enough to keep, long shots that contain little or no change in speed or presence of objects or characters will be cut at the beginning and end of the shot, equidistant from the middle of the shot. The remaining length of the shot will be a fraction of the original shot length coinciding with the overall ratio of the desired compression of the entire audiovisual presentation.

When dialogue is present, shots segments may be weighted as less significant or completely ignored as input, therefore increasing computer-processing efficiency.

Noun Significance Rating Methods

In an embodiment, a segment or segments of text can be extracted from the spoken language or dialogue from a full-length audiovisual presentation by a variety of techniques, including but not limited to: speech recognition, character recognition, and the retrieval of embedded subtitle information.

Any one or combination of these methods may be employed to create a transcript of all or substantially all of the dialogue in a full-length audiovisual presentation.

In many instances, terms used in text segments are compared with their use, and in particular, frequency of use, in larger regions of the starting material. For example, identified Word Segments may be compared with Word Segment usage in an adjacent or other larger region, such as an associated section of dialogue, including for example, multiple adjoining segments, or other regions that may be identified by function (e.g. all spoken by the same person, or spoken at the same location) or other characteristics. Noun frequency of usage is particularly favored and can be used profitably both for shrinkage of text documents as well as shrinkage of audiovisual documents. An example of noun frequency usage for strict text file abridgement is presented next, but the same and similar techniques may be used for abridging audiovisual files, by selecting desired audio segments, and including the visual segments that are linked in time with the audio segments.

In an embodiment shown in FIG. 1, text is summarized by identifying and rating the nouns contained in a text document, such as a transcript, article, paragraph, book, chapter, or essay. Said text may be generated from a speech or subtitles of an audio or audiovisual work.

The first step in the embodiment of FIG. 1 is comparing each Word Segment of a text document to a user inputted set of nouns thought to be of significance to said document. This set may be empty in the some cases, where the user may be unfamiliar with the contents of the segment of text being summarized. In the case of the summarization of an audiovisual presentation, the names of story characters or other nouns known to be of importance to the story can be inputted, manually or automatically.

An optional second step is comparing each Word Segment of a text document to one or more stored sets of nouns specific to a certain field of expertise (such as Medicine, Law, Music, Post-production, Yoga, Buddhism, Business, etc.). Which, if any, of these sets of nouns are accessed is a function of user preference.

The third step is identifying each noun in a text document by comparing every Word Segment in said document to a set of stored common nouns. Said set being part of a locally stored database or remote, on-line database such as WordNet. Any words identified as nouns by matching nouns in such stored sets will be added to a table called the Found Noun Set. Once this set contains at least one entry, it will be the first stored noun set used to compare to each word of the segment of text. The found noun set will contain only one entry of each noun identified. Subsequent matches to this set will result in a tally within a field of the set's table, in effect counting the frequency of use of each entry. Each word of the segment of text being summarized is compared to each of the above noun sets in the order described. If no match is found then the word is skipped. If a match occurs, the search continues immediately to the next word segment in the text document. The name of the noun set from which the match occurred will be recorded in a field of the Found Noun Set in the same line also containing the identified noun and its occurrence count. Identification of the noun set from which the match occurred may weight the noun occurrence differently based on user preference.

A Named Entity Tagger may be employed to identify and tag entities and other proper nouns. For the purposes of simplifying analysis parameters, any noun that is capitalized will be considered a proper noun. Resulting rating errors will be within an acceptable range and will not noticeably affect the output file.

The fourth step is to assign a rating value to each noun by tabulating its frequency of use in the overall text document. The rating of each noun is considered the noun's Noun Significance Value. Each pronoun in a document is identified by comparing every word in that document to a set of stored Pronoun Type Sets. Each pronoun is matched to its antecedent by observation of their proximity of placement in the sentence structure of the current sentence as well as the adjoining sentences preceding. The Noun Significance Value of each identified antecedent is increased based on the frequency of identified pronouns that describe it. Relative pronouns may be ignored.

In the case of the summarization of an audiovisual presentation, the character speaking the sentence and any character to whom the sentence is directed will be identified by manual or automatic methods and this information will determine the subject of any first or second person pronouns, respectively.

The fifth step is identifying each Sentence Segment in the text document. In writing, a sentence usually begins with a capital letter and concludes with appropriate end punctuation. In speaking, a sentence exhibits characteristic patterns of stress, pitch, and pauses that may differ from adjacent sentences.

The sixth step is to assign a Sentence Segment Significance Value to each Sentence Segment based on formula relating the significance values of nouns contained in that sentence. In an embodiment, a mere summing of the Noun Significance Values contained in the Sentence Segment will provide the Sentence Segment Significance Value.

The seventh step is to compare each Sentence Segment Significance Value to a threshold set by user input. Sentences with ratings that fall below the threshold will be added to a table of less significant sentences. Sentences with ratings above the threshold will be added to a table of more significant sentences.

The eighth and final step is to reassemble the Sentence Segments from the table of more significant Sentences Segments or to merely skip the less significant Sentences Segments. The resulting output of this method represents a summarized version of the original segment of text.

Sentence Segment Clusters are groups of adjacent significant Sentence Segments or groups of adjacent non-significant Sentence Segments. In lengthy text documents, auto-summarization is likely to produce such clusters. Any single non-significant Sentence Segments surrounded by two significant Sentence Segment Clusters shall be included in the summary as if they were rated as significant Likewise, any significant Sentence Segments surrounded by two non-significant Sentence Segment Clusters will be omitted from the summary as if they were rated as non-significant. The number of contained Sentence Segments needed to qualify said Sentence Segment Clusters as controllers in such cases, will be determined by a formula based on the total number of Sentence Segments in the over-all text document.

In the case of a short to medium length text document, such as a news article, the first sentence may be included in the summary whether or not it is rated as significant.

The method of noun analysis for shortening may be used to prioritize audio segments, but the same procedures may be used on text documents themselves. Such text shortening is another embodiment contemplated as part of the invention. A practical working example useful to illustrate a method for audiovisual piece shortening as well as regular text article shortening is shown in FIGS. 2 to 6. FIG. 2 is a news article. FIG. 3 is the same article separated into numbered sentences. FIG. 4 is an example of the article summarized by 48%, via use of noun frequencies as described herein.

FIG. 5 is an example of the article summarized by 75% by this method wherein the threshold of noun usage was set more stringently. FIG. 6 is the matrix with which the nouns and sentences were rated for automatic summarization. As will be appreciated from a comparative reading, the use of noun frequencies in this manner with text alone provides an advantageous shortening and is a desirable embodiment useful for the literary arts.

The noun rating method shown in FIGS. 1-6 was applied to several audiovisual recordings wherein the video segments were simply linked to the audio segments. Shortening was carried out via characterization of text in the audio segments. In the case of the summarization of an audiovisual presentation, each sentence is a dialogue segment, and desirably may be tagged with a segment marker, associating it with a table of segment attributes, including but not limited to the name of the character speaking the line, the line's beginning and ending timecodes, the components contained in that line, and the ratings of said components. Said components can be defined as Characters, Persons, Objects, Concepts, Events, Places, Items, or Nouns. Timecode may be represented in hours, minutes, seconds, and/or frames. A value of 0 Hours, 0 Minutes, 0 Seconds, and 0 Frames (example, shown as 0:00:00:00) may be assigned to the first frame, or beginning, of an audiovisual presentation. Typically timecode progresses linearly to the end of an audiovisual presentation. A position or moment of the audiovisual presentation can be represented in this way to the accuracy of one Frame, by a given Timecode Value.

Analysis Methods and Resources

The determination of which character speaks a dialogue line may be carried out by computer recognition of audio and/or video information, or may be done manually. The software may employ voice pattern recognition to distinguish between different speakers. At times the software may not be able to accurately identify the speakers and may be confused by similar sounding speakers. In this case the software will make other logical deductions based on the known character and dialogue statistics to calculate the probability as to which character is speaking. Also, the software may employ a visual "face-recognition" algorithm that identifies on-screen characters by proportional measurements of and between their facial features. This will assist in the identification of which character is speaking. "Face-recognition" also can assist in calculating the "shot significance value" in non-dialogue segments. In an embodiment, machine-learning methods, for example U.S. Pat. No. 5,819,247, and methods for boosting the performance of machine-learning classifiers, as in U.S. Pat. No. 7,024,033, can be employed in conjunction with image analysis systems, as referenced in U.S. Pat. No. 5,479,575, to identify objects and characters contained in various shot segments.

For the purpose of character identification, a database can be created, stored either locally or on-line, said database archiving relevant data about actors, celebrities, politicians, and other prominent or famous individuals, with pre-computed process-response statistical models, sample photos of various angles, voice imprint samples, resumes with character names. Data sets may also archive Film and Television credits, cross-referencing actors names with character names.

Another embodiment provides a system having a summarization program which for the purpose of character identification, can access a database, stored either locally or remotely, that archives relevant data about actors, celebrities, politicians, and other prominent or famous individuals, with pre-computed process-response statistical models, sample photos of various angles, voice imprint samples, and resumes with character names. Data sets may also archive Film and Television credits, cross-referencing actors names with character names Another embodiment provides a system that analyses media by a Disk Crawler program, in the background of computer functions or while the computer is otherwise idle. The functionality of the Disk Crawler program is prioritized by user input or stored user preference data. The purpose of the program is to perform the potentially lengthy and processor greedy analysis process in advance. This will enhance user experience by reducing wait time.

A most desirable embodiment provides a system, wherein a summarization program accesses a data base of pre-analyzed audiovisual presentation data, therefore bypassing the potentially lengthy and processor greedy analysis process. The actual customization and summary procedure that follows the analysis requires relatively simple calculations. This will not only save time, but will open the custom summarization market to smaller, cheaper, and less powerful processors, such as can be feasibly manufactured in cell phones and other portable devices. In this embodiment, the analysis function and the summarizing function may be split into two independently operating systems.

Yet another embodiment provides a method wherein pre-analyzed audiovisual presentation data is accessed containing all sound waveform information at multiple points of an audiovisual presentation with an available variance of +/−0.04%. Once an absolute sound waveform reference is matched at these points, a global adjustment ratio can compensate for unknown factors of speed variance that may potentially exist between the locally stored audiovisual presentation file and the remote pre-analyzed audiovisual presentation data.

In another embodiment, the audio portion of an audiovisual presentation created in front of a live audience is examined for purpose of detecting audience reactions. Detected audience reactions are separated into segments and are tagged and rated as to their type, length, and intensity, said ratings used in further rating segments and Segment Components of the audiovisual presentation.

In yet another embodiment, each Segment Component is compared to a set of User Preference Components created manually by the user, automatically discovered about the user, or a combination thereof. Components thus identified are weighted more in value than Components identified from other stored sets based on a factor of user input.

Figure 13:
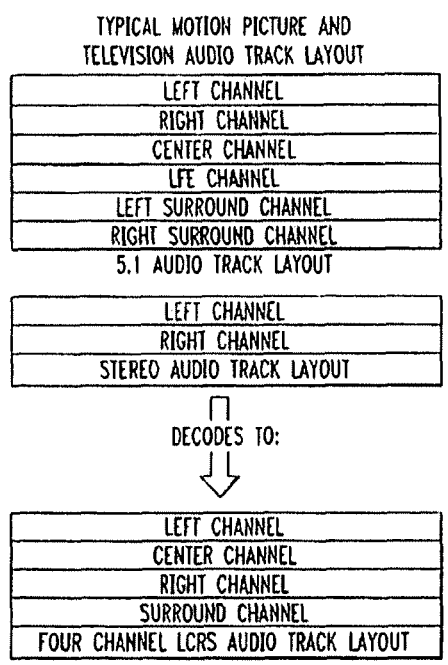
FIG. 13 shows an example of a typical motion picture and television audio track layout.

The audio of modern motion pictures and television programs is typically mixed in multi-track configurations as illustrated in FIG. 13. This can be utilized in an advantageous way in the analysis of various audio components. Since different types of audio information typically reside on these tracks in a standardized fashion, the separate observation of each track of sound will reveal more simple sound waveforms than fully combined mono or stereo mixes, providing for analysis with reduced sound component interference. For example, dialogue is more easily recognizable when not obscured by music and background noise. In a multi-track audio mix of an audio-visual presentation, the center track typically contains most of the dialogue and natural sound effects. In a musical number or music video the center track typically contains the main vocals. The left and right tracks typically contain music, background atmospheres, and large sound effects. The surround tracks usually contain similar information to the left and right tracks, but at lower levels. The low frequency effects ("LFE") track contains only low frequency information which serves to add weight to music and sound effects. The presence of information on the LFE track may be used to aid in the detection of action and music scenes. A stereo track may be passed through a matrix decoding system which will split any center-panned information to a separate center track and any out of phase information to a separate surround track, essentially splitting the stereo pair of audio tracks into four audio tracks providing for easier analysis. In some embodiments, the stereo tracks may be used to enhance the detection of non-dialogue with music segments.

A well-known audio function called "Time Compression" is incorporated into most audio manipulation software, such as U.S. Pat. No. 5,883,804. Time Compression shortens the time of the audio file (or makes it faster) without raising the pitch. This is accomplished by breaking the sound file into tiny equal length segments and removing some of the segments in an alternating or otherwise repeating pattern. It can also be accomplished by speeding up the audio file, then lowering its pitch to the audio file's original reference pitch. Time compression can be performed on the output file of this invention to further shorten the summarized version.

Time Ordered Assembly

After segment characterization (which optionally may include segment modification, or fusion), the segments are combined to re-create a story that maintains at least some of the original unabridged audiovisual presentation's meaning. In an embodiment, the recombination occurs so that segments (or segment portions in the case of modified segments) are arranged in the summarized piece in their original time order.

Assembly into time order can be achieved by a number of techniques known to the skilled artisan. In an embodiment, undesired portions are removed from an unabridged audiovisual presentation. In an embodiment, segments from an audiovisual presentation are identified and stored in one or more files. Then, desired segments are taken from the one or more files and assembled into the final, shorter product. In an embodiment, segments of an unabridged audiovisual presentation are identified by determination of their starting and ending times (or, for example, starting time plus duration time) and making a table of this time information. A final shortened audiovisual presentation can then be made by selecting segment times from the table and assembling desired segments in a desired order.

Typically, when making a shorter, summarized audiovisual presentation from an unabridged audiovisual presentation, the entire (unabridged) piece is first stored in electronic memory, such as a computer hard drive or other storage device. Desired segments, which optionally may be separated into distinct memory locations as separate (additional) copies, are assembled in a time order. After or during assembly, the assemblage is exported into a digital storage medium such as a hard disk, flash-ram chip, DVD or streaming video Internet files, as an integral, shorter piece.

In another embodiment, no separate copies of segments are stored outside of possible temporary file, and instead are assembled in a time order into a shorter piece by copying sections from the unabridged audiovisual presentation. In yet another embodiment, the entire unabridged audiovisual presentation (or at least most of it) is combined with information of segment location to make a shorter audiovisual presentation. In this latter embodiment, a user can watch the unabridged audiovisual presentation, or portions of it, but also can watch an abridged form (or portions of it) by selecting the shorter version. Software that (for example) takes segment time information can be turned on or adjusted to provide the user either the long version, or a shorter version, including multiple shorter versions, as desired. A user, according to this embodiment can watch the unabridged version and interrupt such playback to watch instead a shorter version.

A customized summarization may be performed for individual users by the manipulation of various parameters and by reference of a personal preference database weighting the component significance values in various ways. This set of stored preferences may have been created manually by the user, automatically discovered about the user, or a combination of these methods.

Examples of user preferences may include negative or positive values for keywords or concepts, such as sex, violence, car crashes, swear words, body parts, kissing, face punches, shoes, hair, etc. In an embodiment, certain words when detected, such as swear words or names of former lovers, can be removed, beeped, or reversed. Also, extreme negative values for keywords such as breasts, sex, and drug use, could be used to essentially clean up content for the consumption of children, old ladies, and religious people.

Significance Curve Overlays

Figure 10:
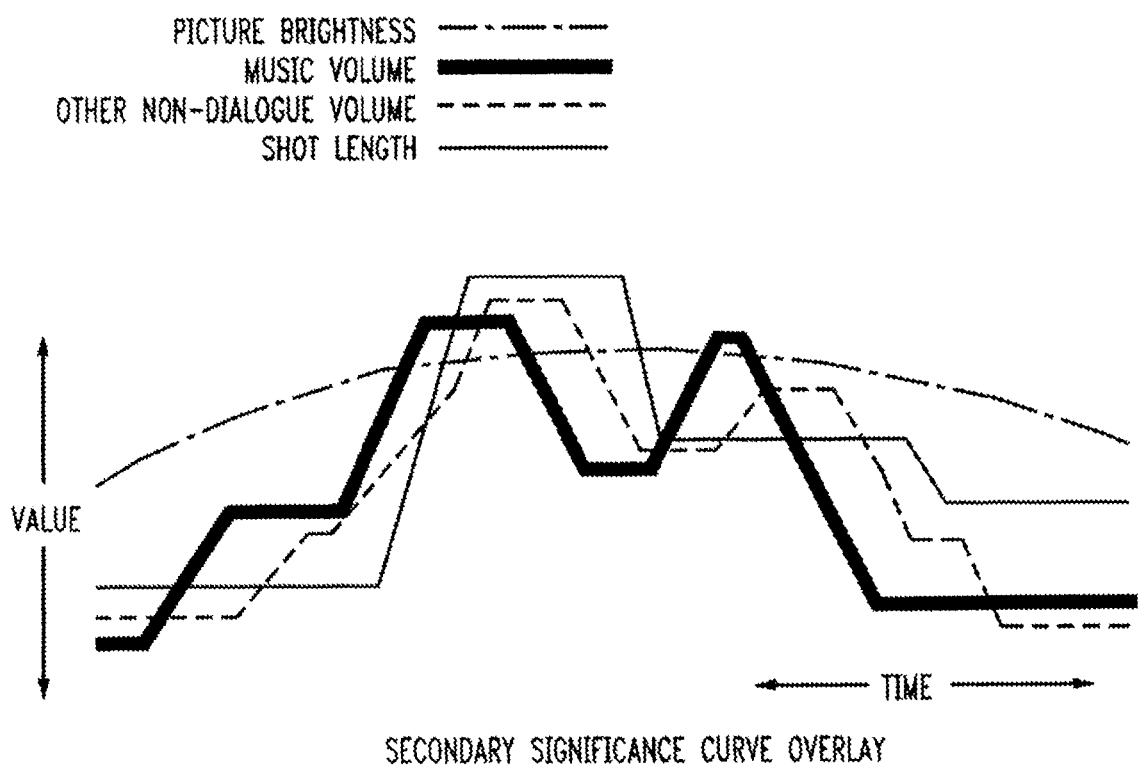
FIG. 10 shows an example of a Secondary Significance Curve Overlays plotted on 2-axis graph.
Figure 11:
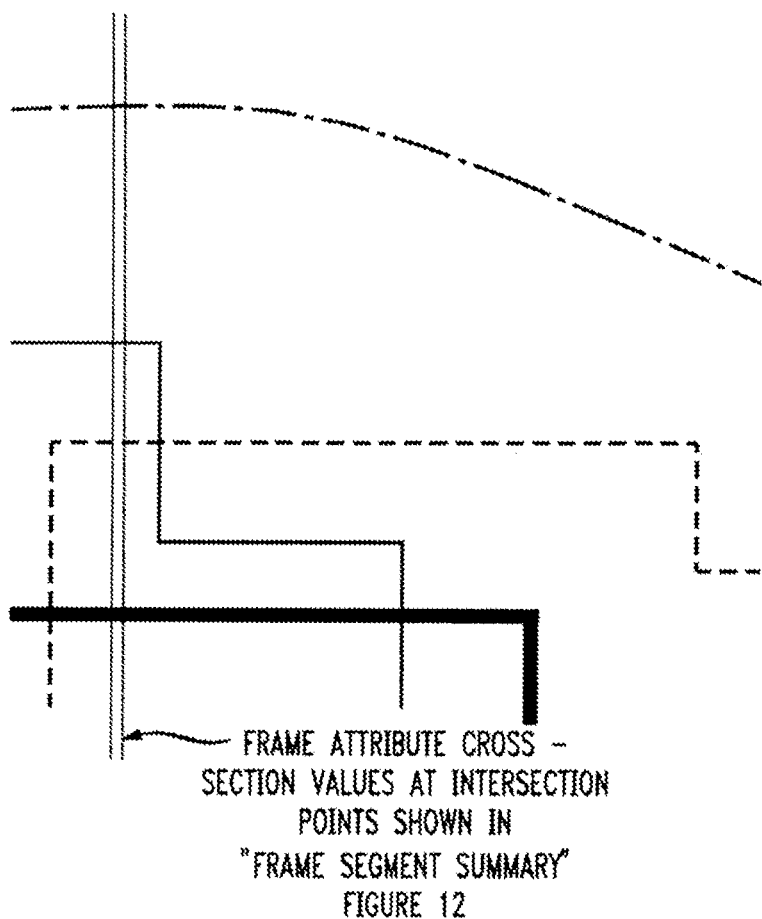
FIG. 11 is a detail of FIG. 9, showing an example of a Frame Attribute Cross Section.

A separate evaluation of audio and video segments and other types of segments could provide Significance Curve Overlays, which can be plotted on a two-axis graph representing Significance Ratings over time, (See FIGS. 10 and 11) In an embodiment, said Significance Curve Overlays could be used to weight the primary method of segment rating. For example, during dialogue sections of an audiovisual presentation, the dialogue segments can be used as the primary method of segment rating while the Significance Curve Overlays for Shots and Music can be used merely as a weighting parameter. Examples of Significance Curve Overlays can include: Dialogue Segments, Shot Segments, Shot Length, Music Segments (volume, tempo, type), presence of transient sounds, volume (overall), audience reactions, emotions (various types), etc.

Figure 7:
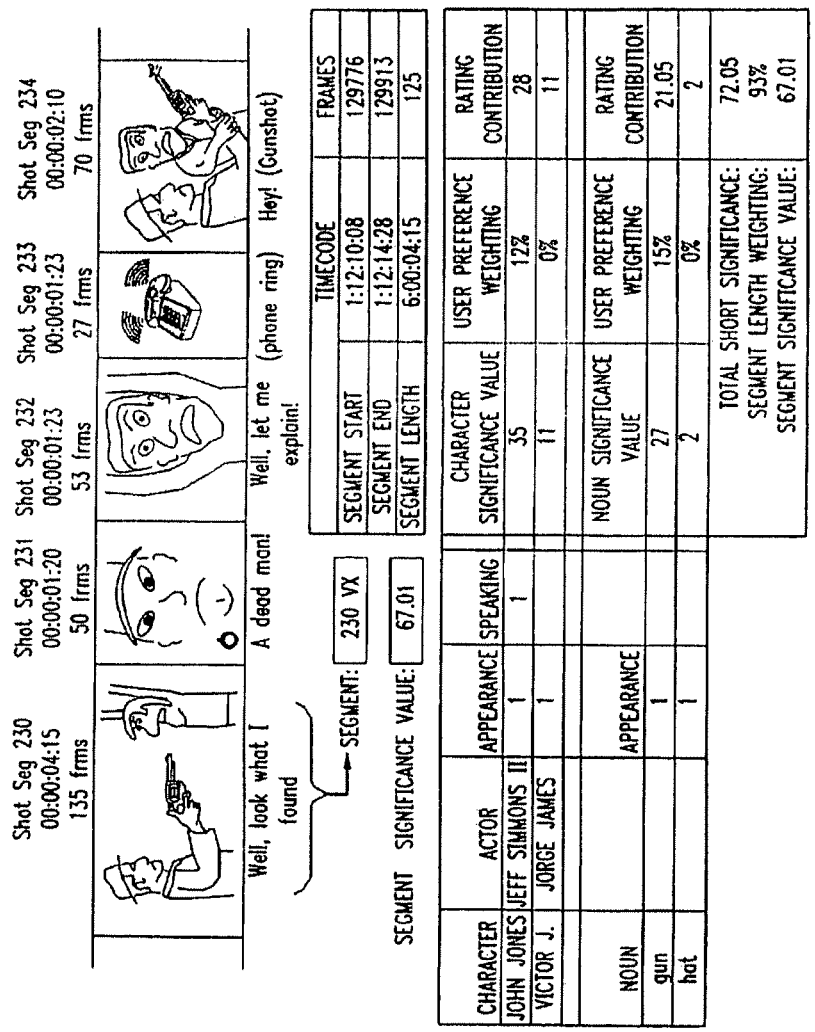
FIG. 7 shows an example of a Segment Attribute Summary.
Figure 9:
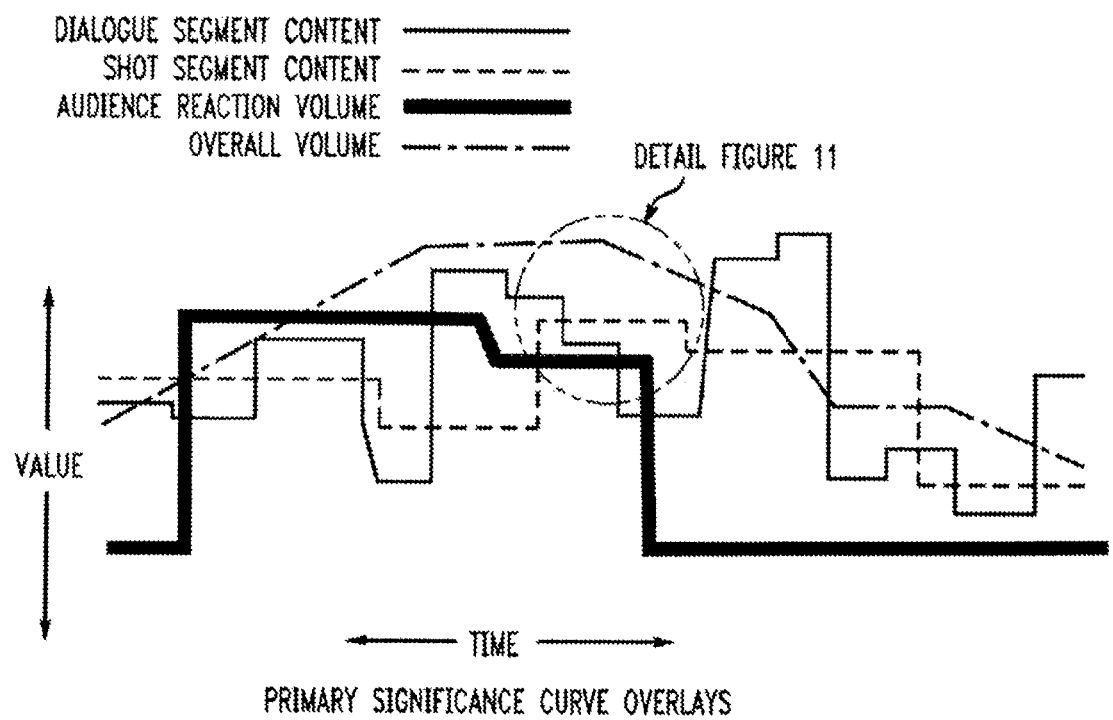
FIG. 9 shows an example of Primary Significance Curve Overlays plotted on 2-axis graph.

In yet another embodiment, all audio and visual segments are distinguished by their type (Dialogue Segments, Music Segments, Audience Reaction Segments, Shot Segments, etc.). All data pertaining to Parameters and Components of said Segments will be tabled in a Segment Attribute Summary (FIGS. 7 and 8). In an embodiment, the data of Segment Attribute Summaries are plotted as a Significance Curve Overlay on a two-axis graph representing Significance Ratings over time. (See FIGS. 10 and 11) The Significance Curve Overlays optionally are used to weight the primary method of segment rating and to visualize the interaction between the various segment attributes in a time line.

The priority level of each segment type at a particular point in a time line will determine the weight of the significance of its value in relationship with other segment type values at said point. This priority level will be incorporated into a formula that generates a final value for that segment type for that moment.

In a preferred embodiment, the entire audiovisual presentation can be divided into Frame Segments (usually 24 to 30 per second). A Frame Segment Summary (See FIG. 12) contains the value data from each segment type, as it exists during that Frame Segment of the audiovisual presentation. In this embodiment, each Frame Segment would be rated individually based on said value data contained therein. Any Frame Segment or Frame Segment Cluster falling below a user inputted Frame Significance Value Threshold would be skipped.

Frame Segment Clusters are groups of adjacent Frame Segments. The boundaries of said clusters may be determined by their relationship to the primary and secondary segment types of that moment. In lengthy audiovisual presentations, auto-summarization is likely to produce such clusters. Any "small" cluster of non-significant Frame Segments surrounded by two "large" significant Frame Segment Clusters may be included in the summarized audiovisual presentation as if they were rated as significant. Likewise, any "small" cluster of significant Frame Segments surrounded by two "large" non-significant Frame Segment Clusters may be omitted from the summarized audiovisual presentation as if they were rated as non-significant. The relative size of the aforementioned "small" and "large" clusters will be determined by a formula based on the total number of Frame Segments in the over-all full-length audiovisual presentation.

In an embodiment, Segment Clusters can be managed by the use of multiple Secondary Significance Thresholds above and below the Primary Significance Threshold, as illustrated in FIG. 18. Segment values will fall into zones divided by the multiple Significance Thresholds. The zones may have negative and positive values based on their proximity to the Primary Significance Threshold. When Segment Clusters are omitted or included based on greater amounts of surrounding Segment Clusters, an attempt may be made to equalize the numbers of the segments artificially omitted and included based on opposing positive and negative zone values.

Figure 19:
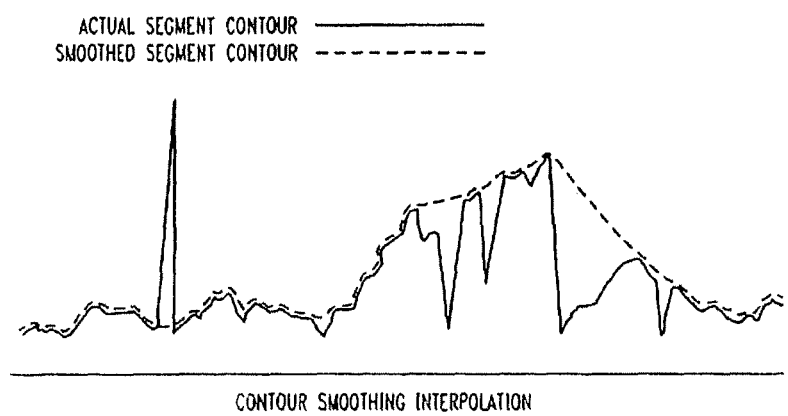
FIG. 19 shows an example of using contour smoothing interpolation in the management of segment clusters or frame clusters.

In a most desirable embodiment, Segment Clusters can be managed through a process of contour interpolation as illustrated in FIG. 19. In a 2-axis plotting of final segment attributes, the graph will resemble a cross-section of mountains and valleys of land. The contours and slopes of the line connecting the plotted segment values may be traced by a program, which will resist a slope deviance greater than 90 degrees, particularly when a connected leg crosses the Primary Significance Threshold from above or below. The resulting contour line will effectively be smoothed, removing sharp peaks and crevices, reducing content relationship adjacency artifacts.

Smoothing of Segment Boundaries

Certain artifacts can occur in the output file of this automatic procedure, such as jump cuts, choppy sound edits, or concepts and visuals that lack sufficient introduction. Higher percentage of auto-summarization will produce higher numbers of artifacts, With time, users will surely become accustomed to consuming greedily summarized media and may forgive many of these artifacts. Even so, every attempt should be made to assure a more pleasurable consumption of summarized media.

Many of the issues of concept introduction and content relationship adjacency can be resolved by accurate segment boundary detection and the discovery of proper formulaic relationships between the various overlapping segment types.

General audio edits may be smoothed with simple cross-dissolves of various lengths. The smoothness of audio edits within rhythmic Music Segments can be improved by a system that analyzes music to detect musical beats, as in U.S. Pat. No. 7,132,595, the contents of which are incorporated by reference in their entireties.

In many cases, summarization requires that audio segments are skipped within the boundaries of a visual Shot Segments. This will most likely result in what is known in the film industry as a "jump-cut." In an embodiment, one proposed remedy is to perform a short cross-dissolve of the out-going to in-coming Shot Segment portions. In another preferred embodiment, alternating Shot Segment portions can be selected for a "digital zoom-in" The overall change in the shot framing will be perceived by the viewer of the summarized audiovisual presentation to be a different shot, therefore effectively reducing the jump-cut effect. In some cases, a combination of these techniques can be used.

Returning back to calculating dialogue segment significance values, FIG. 14 shows a list of dialogue segments from a scene with the start and stop frame indicated for each dialogue segment. Once the dialogue segments have been isolated, the dialogue segment significance value is determined by assessing the word significance value of each dialogue segment.

FIG. 15 shows an example of a dialogue segment attribute summary for line 55 from a particular scene to show how the significance value of this particular dialogue segment is determined. The dialogue segment attribute summary comprises a sentence, a significance value indicator, a sentence parameter, such as the start frame, stop frame and the times for the start and stop frame, word significance values of certain words, and a list of characters, preferably listed in order of significance. The speaking character can be identified manually or automatically. Words can then be identified and assigned a word significance value. In this particular example, "Ben" is the speaker and is therefore the first person noun and assigned a word significance value of 57.6 based on the number of times he has been referred to in the audiovisual presentation. The first person pronouns "I" and "me" are also matched with "Ben" since "Ben" is the speaker. Therefore, the first person pronouns are also assigned the same word significance value as "Ben", which is 57.6. Since "Barbara" is being spoken to, "Barbara" is identified as the second person noun and assigned a word significance value of 436.7 based on the number of times reference has been made to her in the audiovisual presentation. The second person pronoun "you" is matched with "Barbara" based on the proximity to the name "Barbara." Therefore, the second person pronoun is assigned the same word significance value as "Barbara" or 436.7. Other words, which may have been matched in a database are also assigned word significance values. In this example, the word significance values are summed to give the dialogue segment significance value. This process is repeated for each dialogue segment in the scene or the entire audiovisual work. Once each dialogue segment has been analyzed, the dialogue segments and their respective significance values can be listed in a dialogue segment overview list to assess whether the dialogue segment is above a threshold significance value or below a threshold significance value.

FIG. 16 shows an example of a dialogue segment overview list comprising the dialogue lines and their respective frame ranges, dialogue segment significance value, deviation from a threshold, and mode. In this particular example, the threshold has been set at 430.2. As shown, dialogue segment significance values above this threshold is assigned a mode of "1" to indicate that they are above threshold, and dialogue segment significance values below threshold are assigned a mode of "0" to indicate that they are below threshold.

Figures 17A, 17B, 17C:
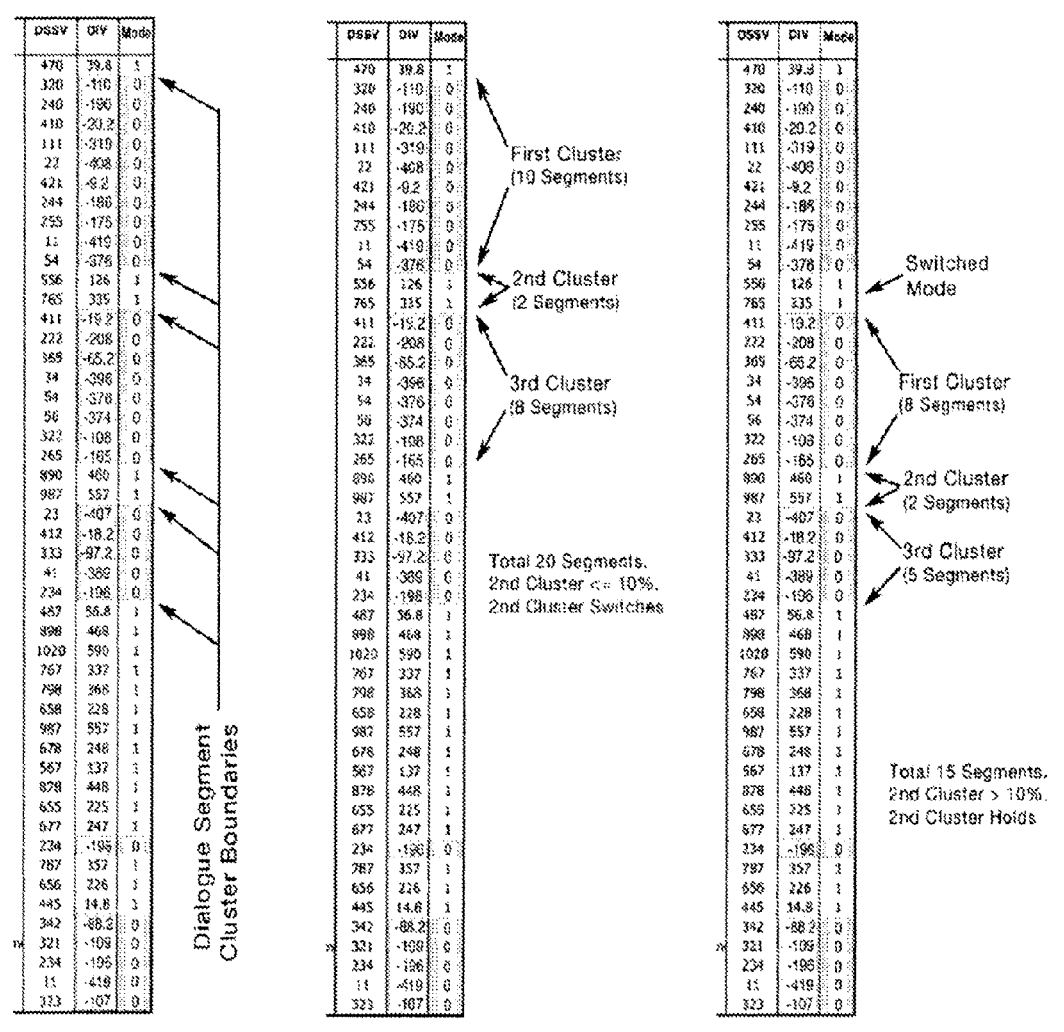

In some embodiments, the mode can be reversed by analyzing adjacent clusters, referred to as cluster adjacency. For example, as shown in FIGS. 17A and 17B, focusing on the mode, it can be seen that the modes form clusters of 1's and 0's, a cluster being defined as a dialogue segment or series of uninterrupted dialogue segments of the same mode bordered by dialogue segments of a countervailing mode. In this example, the first cluster contains 10 dialogue segments of 0's, the second cluster contains 2 dialogue segments of 1's, and the third cluster contains 8 segments of 0's. In some embodiments, modes with 0's are simply thrown out and modes with 1's are kept.

In some embodiments, however, a countervailing cluster surrounded by two adjacent cluster may be reversed if the number of dialogue segments in the countervailing cluster is fewer than the total number of dialogue segments in the analyzed group of clusters. In this example, there are 2 dialogue segments in the countervailing cluster and a total of 20 segments for the group of three clusters. In this example the threshold is set at 10%, therefore, since the countervailing segments are 10% of the total segments in the group, the mode of the countervailing segments would be reversed to 0 and deleted with the two adjacent clusters.

In some embodiments, once the mode of a cluster is reversed, that cluster does not merge the two adjacent clusters to form a new larger cluster. Rather, all clusters are established prior to any reversals. Therefore, as shown in FIG. 17C, even though the second cluster in FIG. 17B was switched, that switch does not merge the first and third cluster into one large cluster of 20 dialogue segments. Rather, the third cluster of 8 segments is used in analyzing the next group of clusters. In the example in FIG. 17C, the countervailing cluster of 2 dialogue segments are surrounded by to clusters of 8 and 5 dialogue segments, respectively, having the opposite mode as the countervailing cluster. Using the same 10% threshold, since the 2 dialogue segments in the countervailing clusters is greater than 10% of the total dialogue segments in that group, the mode of the countervailing cluster remains a 1 and those dialogue segments are kept in the summarized version.

In some embodiments, whether the countervailing mode of a dialogue segment is switched or reversed may further depend on the degree of deviance from the significance value threshold for that dialogue segment and the degree of deviance of the dialogue segment or clusters surrounding the dialogue segment having the countervailing mode. For example, if the absolute values of the deviance from the primary threshold of two bordering dialogue segments is greater than the absolute value of the deviance of the countervailing dialogue segment being bordered, then the mode of the countervailing dialogue segment may be reversed.

In some embodiments, as shown in FIG. 18, secondary significance thresholds may be set up to create zones of varying deviance from the original or primary significance threshold. The zones can be used to further weight the clusters to determine whether a mode in a countervailing cluster should be reversed or switched.

Thus, the present invention discloses, a method for summarizing an audiovisual presentation comprising providing the audiovisual presentation having a first temporal length, the audiovisual presentation comprising an original time order, and a plurality of dialogue segments, each dialogue segment comprising a segment component; rating each dialogue segment by determining a significance value for each dialogue segment; and using a significance value threshold to select the dialogue segment if the significance value exceeds the significance value threshold, and delete the dialogue segment if the significance value is below the significance value threshold, thereby forming a summarized version of the audiovisual presentation having a second temporal length. In some embodiments, the dialogue segment may be a single sentence. In some embodiments, the dialogue segment may be a series of uninterrupted sentences spoken by a single character. The term "sentence" is not limited to a grammatically correct sentence, but rather, includes incomplete sentences, phrases, run-on sentences, expletives, and the like.

The segment component may be a word having a word significance value, wherein the significance value of each dialogue segment is determined by a combined rating of word significance values of each segment component in the dialogue segment. The word significance values are determined by at least one word characteristic, such as whether the word is a noun or a pronoun, whether the word is a reference to a character, an identity of the character referenced, a frequency of occurrence of the word in the audiovisual presentation, a match of the word to a predetermined database word. The database may include words provided by an operator of the system or the service provider, or by the user or viewer, or both.

In some embodiments, the word is the reference to a character and the word significance value is determined by a frequency of use of the character's name in the audiovisual presentation and a frequency of use of a pronoun referring to the character in the audiovisual presentation. The pronoun may be a first person pronoun matched to a speaking character, a second person pronoun matched to a non-speaking character, or a third person pronoun matched to any character.

Matching the pronoun with the character may be accomplished by a variety of methods, such as voice imprint recognition analysis, face recognition image analysis, embedded subtitle analysis, or manual analysis for the purpose of antecedent identification of the character referred to by the pronoun. The first person pronoun can be matched to a character by identifying the speaking character. The second person pronoun can be matched to a non-speaking character when only two characters are present in a dialogue scene. Third person pronouns are more difficult to match with a character; however, gender identification can facilitate the process, For example, in a scene with all men and one woman, reference to "she" or "her" could indicate that the character referenced was the woman in the room. This may not be entirely accurate, and so, other methodologies described herein may also be employed.

In some embodiments, the pronoun is identified by comparing the pronoun used in the dialogue segment with a database of pronoun type sets. Once identified as a pronoun based on the database, the pronoun is then matched to an antecedent noun based on proximity of the pronoun to the antecedent noun in a dialogue segment, or within a cluster of dialogue segments. In some embodiments, a relative pronoun is ignored.

Any unmatched pronouns may be assigned a pronoun significance value. The pronoun significance value may be determined by averaging the word significance values of all the words that refer to a character, averaging the word significance value of all the words that refer to a character within a predetermined number of adjacent dialogue segments, or averaging the word significance value of a predetermined number of the most frequently referred to characters.

In some embodiments, the segment components may be compared with a verb set and an adjective set to determine negativity of the dialogue segment to weight the word significance value based on a predetermined set of values. The set of values may be predetermined by the user or viewer or by the service provider.

In some embodiments, the rating of each dialogue segment as being above the threshold or below the threshold may be modified. For example, as shown in FIG. 16, the summarization method may further comprise analyzing a group of dialogue segments, wherein the group of dialogue segments comprises a first cluster of rated dialogue segments having a first mode or rating designation, followed by at least one countervailing rated dialogue segment having a countervailing mode or rating designation opposite that of the first mode, followed by a second cluster of rated dialogue segments having a second mode or rating designation that is the same as the first mode; determining a percent of composition of the countervailing rated dialogue segments to the total number of dialogue segments in the group of dialogue segments; and converting the countervailing mode to that of the first and second modes if the percent composition is less than a predetermined value. The mode or rating designations can be any indicator to indicate whether the significance value is above the threshold or below the threshold. The predetermined value may be established by the user by identifying the percent truncation of the audiovisual presentation. Alternatively, the predetermined value may be set by the service provider or operator.

For example, FIG. 16 shows a dialogue segment overview panel. The point at which one segment mode type ends and a single segment or cluster of segments of the opposite mode type occurs, is referred to as a dialogue segment cluster boundary. A dialogue segment cluster boundary also occurs at the beginning or end of a non-dialogue shot segment cluster. At each dialogue segment cluster boundary the segments of the next three adjacent segment cluster will be counted. The middle, or second, cluster is the opposite dialogue segment significance mode type of the first and third clusters. If the number of segments in the second cluster is less than or equal to some predetermined percentage, for example 10%, or within approximately 8% to approximately 15%, of the total number of the three segment clusters counted, the segments of the second cluster will switch or be converted to the same segment mode as the first and third segment clusters. The next dialogue segment cluster boundary will occur at the beginning of the third segment cluster (which at this time becomes the first cluster of the next set of three clusters). The 10% value will be referred to as the dialogue segment mode toggle and will be represented as an operator inputted variable on the overview panel. In other embodiments, this percent could beneficially be as low as approximately 2% or as high as approximately 40%. In some embodiments, the dialogue segment mode toggle may be directly or indirectly determined by the user. For example, based on the amount of compression or truncation the user wants, the dialogue segment mode toggle can be raised or lowered. Also represented on the overview panel is the number of switched segments shown in two gauges labeled by the segment type from which they were switched. Adjacent to these gauges will be more gauges displaying the summed lengths, in frames and timecode, of the switched mode types along with the average dialogue segment significance value of each switched type. This data will be used in an attempt to equalize the number of switched segments.

In some embodiments, whether a mode or rating designation is reversed may depend on the degree or extent the significance values of dialogue segments deviate from the significance value threshold, referred to as significance value deviance. For example, with reference to FIG. 18, the converted countervailing mode may be reversed if the absolute value of the significance value deviance of the countervailing rated dialogue segment is greater than the average of the absolute values of the significance value deviances of the two dialogue segments immediately adjacent to the countervailing rated dialogue segment.

Other algorithms may be utilized in determining whether a converted countervailing mode is re-converted back to its original mode. For example, the algorithm may also take into account the number of countervailing rated segments relative to the size of the bordering clusters or the number of dialogue segments in the bordering clusters. In some embodiments, the deviations may be divided into various zones defined by secondary significance value thresholds. The mode of a dialogue segment may depend on the zone in which the dialogue falls and the zones in which the adjacent dialogue segments or segment clusters fall.

An audiovisual presentation generally comprises secondary segments, such as non-dialogue segments, non-dialogue segments with music segment, shot segments, and audience reaction segments. In some embodiments, these secondary segments each comprise a secondary significance value that can be used to weight the significance value of the dialogue segment.

In an embodiment using audience reaction to weight the significance value determining the secondary significance value of the audience reaction comprises separating the audience reaction into reaction segments; characterizing the reaction segments in terms of at least one reaction parameter selected from the group consisting of reaction type, reaction length, and reaction intensity; and rating the characterized audience reaction based on the combined rating of the reaction segments for the audience reaction to weight the significance value preceding the audience reaction.

Weighting of the significance value with the secondary significance values may comprise plotting the significance value of the dialogue segment and at least one secondary significance value as a significance curve overlay on a two-axis graph representing the significance value and the at least one secondary significance value as a function of time in order to weight the significance value for each dialogue segment.

The significance value may also be weighted by a perceived presence of stress and the perceived presence of stress is determined by assessing a character communication parameter, such as a volume of speech, a tone of speech, a rate of speech, and a facial expression.

Once the below-threshold dialogue segments are removed, the remaining above-threshold dialogue segments may be reassembled and smoothed. In some embodiments, smoothing may be achieved by using contour interpolation. Smoothing the summarized version of the audiovisual presentation using contour interpolation comprises preparing a multiple axis plot of final segment attribute values over time; connecting the plotted segment values creating a graph that resembles a cross-section of mountains and valleys; tracing the plotted line; resisting a predetermined maximum angle deviance of a predetermined value or input; and effectively removing sharp peaks and crevices of said cross-sections, thereby minimizing content adjacency artifacts.

In some embodiments, audiovisual presentation is stored on a storage device comprising a center track comprising the dialogue segment and a plurality of peripheral tracks surrounding the center track, the peripheral tracks comprising non-dialogue sound, such as music, background, and the like. To improve the efficiency and effectiveness of analyzing a dialogue segments, the dialogue segment analyzed is from the center track to filter out the non-dialogue sounds to increase the accuracy of analyzing the dialogue segment.

In some embodiments, a quick way to summarize an audiovisual presentation is to select a first portion of an original non-dialogue segment with music and a last portion of the original non-dialogue segment with music to include in the summarized version of the audiovisual presentation and delete a middle portion of the original non-dialogue segment with music from the original non-dialogue segment with music to form the summarized version of the audiovisual presentation, wherein the ratio of the combined length of the included portions to the length of the original non-dialogue segment with music is equal to the ratio of the second temporal length to the first temporal length. The amount of the first and last portions to keep and the amount of the middle portion to delete may be predetermined or may be dependent on the user's request. In other words, the amount of the middle portion deleted may depend on the percent of the audiovisual presentation the user wants truncated or compressed.

In some embodiments, the summarization method may further comprise receiving a playback time request within which to play the summarized audiovisual presentation; and automatically calculating the significance value threshold so that the summarized audiovisual presentation fits within the playback time request.

In some embodiments, the method of automatically summarizing an audiovisual work comprises providing the audiovisual work comprising a plurality of sentences, each sentence comprising a plurality of words; determining a word significance value for each word in the plurality of sentences; determining a sentence significance value for each sentence based on a combined word significance value of the words contained in the respective sentence; establishing a sentence significance threshold; comparing each sentence with the sentence significance threshold to rate the sentence as an above-threshold sentence or a below-threshold sentence; summarizing the audiovisual work by deleting the below-threshold sentence and selecting the above-threshold sentence; and reassembling the above-threshold sentence with another above-threshold sentence, thereby summarizing the audiovisual work.

The word significance value may be determined by comparing the word to at least one database of words selected from the group consisting of a user-defined database, a field of expertise database, and a noun database to determine whether the word segment matches any word in the at least one database, wherein a match increases the word significance value.

In some embodiments, the word is a noun having a noun significance value, wherein the noun significance is determined by a frequency of occurrence of the noun in the audiovisual work. The summarization method may further comprise identifying a pronoun in the sentence by comparing the noun in the sentence to a database of pronoun type sets; and matching the pronoun to an antecedent noun based on proximity of the pronoun and the antecedent noun in the sentence to increase the noun significance value of the noun.

Other Considerations

Embodiments described can be applied in various ways to summarize and/or condense an audiovisual presentation such as a feature film, documentary, television program, or instructional video. However, embodiments also can perform text and language summarization alone (without video information), in various ways. Embodiments can be implemented to distribute condensed and summarized text and/or audiovisual presentations by internet download, internet streaming, cable on-demand viewing, video iPod download, video cell phone download or streaming, DVD or video tape rental or sales, cable broadcast, satellite broadcast, television broadcast, AM radio broadcast, and FM radio broadcast.

Embodiments can be distributed through a consumer operated vending kiosk, through a local hard wired network, or wireless network such as that based on Bluetooth technology, via a digital newspaper, via on-line newspaper or magazine, or other web-based sources of text oriented media. Embodiments can be applied in a reading machine for the blind or visually impaired, to provide audio summaries of documents. In an embodiment, software may be made available for download, or a service may be provided for the analysis and summarization of media.

Embodiments have been described in relation to software implementation, but may also be implemented with specialized hardware.

Although embodiments have been described in relation to various implementations, together with modifications, variations, and extensions thereof, other implementations, modifications, variations, and extensions are within the scope of the invention. The claims therefore are not limited by the description contained herein or by the drawings.

What is claimed:

1. A method for summarizing a text document, comprising:
   a) providing a text document having a first temporal length, the text document comprising:
      i) a plurality of sentence segments, each sentence segment comprising at least one segment component;
      ii) a plurality of secondary segments comprising at least one non-dialogue segment;
   b) rating each sentence segment by automatically determining a significance value for each sentence segment, the method comprising: determining at least two word significance values for at least one characteristic of at least one segment component including determining whether the segment component is a noun, pronoun, reference to a story character, a frequency of occurrence of the segment component, a match of the segment component to a predetermined database word; and combining the at least two word significance values;
   c) determining a secondary significance value of one or more of the secondary segments wherein the secondary significance value weights the significance value of the sentence segment;
   d) receiving a user generated time significance value threshold;
   e) using the significance value threshold to select the sentence segment if the weighted significance value of the sentence segment exceeds the significance value threshold, and delete the sentence segment if the significance value of the sentence segment is below the significance value threshold;
   f) combining each sentence segment with the weighted sentence segment significance value exceeding the significance value threshold into a summarized version of the text document; and
   g) providing the summarized version of the text document, the text document having a second temporal length.

2. The method of claim 1, wherein the word significance values are determined by the identity of a story character referenced.

3. The method of claim 2, wherein the word is the reference to a character and the word significance value is determined by a frequency of use of the character's name in the text document and a frequency of use of a pronoun referring to the character in the text document.

4. The method of claim 3, wherein the pronoun is a first person pronoun matched to a speaking character.

5. The method of claim 3, wherein the pronoun is a second person pronoun matched to a non-speaking character when only two characters are present in a scene containing a sentence segment.

6. The method of claim 3, wherein the pronoun is identified by comparing the pronoun used in the sentence segment with a database of pronoun type sets, and wherein the pronoun is matched to an antecedent noun based on proximity of the pronoun to the antecedent noun.

7. The method of claim 3, wherein a relative pronoun is ignored.

8. The method of claim 1 further comprising comparing the segment components with a verb set and an adjective set to determine negativity of the sentence segment to weight the word significance value based on a predetermined set of values.

9. The method of claim 1, wherein each sentence segment is a sentence and the segment component is a word having a word significance value, wherein the significance value of each sentence segment is determined by a combined rating of the word significance value of each segment component in the sentence.

10. The method of claim 9, wherein the word significance value is determined by comparing the word to at least one database of words selected from the group consisting of a user-defined database, a field of expertise database, and a noun database to determine whether the word segment matches any word in the at least one database, wherein a match increases the word significance value.

11. The method of claim 9, wherein the word is a reference to a character having a noun significance value, wherein the noun significance value is determined by a frequency of references to the character in the text document.

12. The method of claim 11 further comprising: identifying a pronoun in the sentence by comparing the noun in the sentence to a database of pronoun type sets; and matching the pronoun to an antecedent noun based on proximity of the pronoun and the antecedent noun in the sentence to increase the noun significance value of the noun.

13. The method of claim 1, wherein the sentence segment significance threshold is determined automatically when a user determines a percentage of truncation of the audiovisual presentation.

14. The method of claim 1, comprising:
   a) receiving a user generated secondary significance value threshold;
   b) using the secondary significance value threshold to select the sentence segment if the sentence segment significance value exceeds the secondary significance value threshold, and delete the sentence segment if the dialogue segment significance value is below the secondary significance value threshold;
   c) combining each sentence segment with the sentence segment significance value exceeding the secondary significance value threshold into a summarized version of the text document; and
   d) providing the summarized version of the text document, the text document having another temporal length.

* * * * *